United States Patent
Potekhin et al.

(10) Patent No.: US 8,495,171 B1
(45) Date of Patent: Jul. 23, 2013

(54) INDISCRIMINATE VIRTUAL CONTAINERS FOR PRIORITIZED CONTENT-OBJECT DISTRIBUTION

(75) Inventors: Dima Potekhin, Tel Aviv (IL); Ofir Ehrlich, Tel Aviv (IL); Leonid Fainberg, Qiryat Gat (IL); Tomer Altman, Tel Aviv (IL); Gil Shai, Giyataim (IL); Ofer Gadish, Rishon Le'Tzion (IL)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 13/482,638

(22) Filed: May 29, 2012

(51) Int. Cl.
*G06F 15/16* (2006.01)

(52) U.S. Cl.
USPC .......................................................... 709/217

(58) Field of Classification Search
USPC .......................................................... 709/217
See application file for complete search history.

(56) References Cited

U.S. PATENT DOCUMENTS

| | | | |
|---|---|---|---|
| 5,802,292 A | 9/1998 | Mogul | |
| 5,826,031 A | 10/1998 | Nielsen | |
| 5,894,554 A | 4/1999 | Lowery et al. | |
| 6,023,726 A | 2/2000 | Saksena | |
| 6,055,572 A | 4/2000 | Saksena | |
| 6,067,565 A | 5/2000 | Horvitz | |
| 6,085,226 A | 7/2000 | Horvitz | |
| 6,098,064 A | 8/2000 | Pirolli et al. | |
| 6,272,534 B1 | 8/2001 | Guha | |
| 6,338,096 B1 | 1/2002 | Ukelson | |
| 6,385,641 B1 | 5/2002 | Jiang et al. | |
| 6,553,393 B1 | 4/2003 | Eilbott et al. | |
| 6,578,073 B1 | 6/2003 | Starnes et al. | |
| 6,657,647 B1 * | 12/2003 | Bright | 715/856 |
| 6,665,658 B1 | 12/2003 | DaCosta et al. | |
| 6,799,214 B1 | 9/2004 | Li | |
| 6,834,297 B1 * | 12/2004 | Peiffer et al. | 709/219 |
| 6,938,212 B2 * | 8/2005 | Nakamura | 715/748 |
| 6,993,591 B1 | 1/2006 | Klemm | |
| 7,007,237 B1 | 2/2006 | Sharpe | |
| 7,012,612 B1 | 3/2006 | O'Neill et al. | |
| 7,084,877 B1 | 8/2006 | Panusopone et al. | |

(Continued)

OTHER PUBLICATIONS

Bogdanov, D. et al., "A prototype of online privacy-preserving questionnaire system," retrieved from http://courses.cs.ut.ee/2010/security-seminar-spring/uploads/Main/talviste-draft.pdf on Jul. 27, 2012, 6 pages.

(Continued)

*Primary Examiner* — Douglas Blair
(74) *Attorney, Agent, or Firm* — Kilpatrick Townsend & Stockton LLP

(57) ABSTRACT

A system may be provided for dynamically serving a content file with embedded content objects over the Internet to an end user system. A content object request function may receive a request for a webpage defined by the content file, the content file comprising embedded content objects. A content-file modifier may modify the content file to inject a reporting code that instructions to generate one or more reports comprising information relating to the content objects. A report receiver may receive the reports, the reports indicating where the content objects were rendered within the webpage. An object prioritizor may prioritize the content objects based on where the content objects were rendered. A delivery controller may adapt protocols for delivering the content objects to improve access to high-priority content objects.

20 Claims, 13 Drawing Sheets

U.S. PATENT DOCUMENTS

| | | |
|---|---|---|
| 7,100,111 B2 | 8/2006 | McElfresh et al. |
| 7,107,338 B1 | 9/2006 | Nareddy et al. |
| 7,113,935 B2 | 9/2006 | Saxena et al. |
| 7,240,100 B1 | 7/2007 | Wein et al. |
| 7,243,309 B2 | 7/2007 | Koay et al. |
| 7,249,196 B1 | 7/2007 | Peiffer et al. |
| 7,308,490 B2 | 12/2007 | Peiffer et al. |
| 7,373,599 B2 | 5/2008 | McElfresh et al. |
| 7,483,941 B2 | 1/2009 | Carlson et al. |
| 7,594,003 B2 | 9/2009 | Davidson et al. |
| 7,594,013 B2 | 9/2009 | Wang et al. |
| 7,636,770 B2 | 12/2009 | Bennett et al. |
| 7,689,663 B2 | 3/2010 | Kinnan et al. |
| 7,814,172 B2 | 10/2010 | Martin et al. |
| 7,818,686 B2 | 10/2010 | Cooke |
| 7,860,881 B2 | 12/2010 | Haselden et al. |
| 7,886,218 B2 | 2/2011 | Watson |
| 7,941,483 B2 | 5/2011 | Kumar Narayanan et al. |
| 7,958,232 B1 | 6/2011 | Colton et al. |
| 8,060,518 B2 | 11/2011 | Timmons |
| 8,112,703 B2 | 2/2012 | Kumar et al. |
| 8,122,102 B2 | 2/2012 | Wein et al. |
| 8,166,079 B2 * | 4/2012 | Lewin et al. .................. 707/803 |
| 8,219,633 B2 | 7/2012 | Fainberg et al. |
| 8,250,457 B2 * | 8/2012 | Fainberg et al. .............. 715/205 |
| 2002/0063714 A1 | 5/2002 | Haas et al. |
| 2002/0078087 A1 | 6/2002 | Stone |
| 2002/0078165 A1 | 6/2002 | Genty et al. |
| 2003/0101412 A1 | 5/2003 | Eid |
| 2004/0030717 A1 | 2/2004 | Caplin |
| 2004/0088375 A1 | 5/2004 | Sethi et al. |
| 2004/0215665 A1 | 10/2004 | Edgar et al. |
| 2004/0225562 A1 | 11/2004 | Turner |
| 2005/0044491 A1 | 2/2005 | Peterson |
| 2005/0138143 A1 | 6/2005 | Thompson |
| 2005/0154781 A1 | 7/2005 | Carlson et al. |
| 2005/0198191 A1 | 9/2005 | Carlson et al. |
| 2006/0093030 A1 | 5/2006 | Francois et al. |
| 2006/0218305 A1 | 9/2006 | Kinnan et al. |
| 2007/0022102 A1 | 1/2007 | Saxena |
| 2007/0156845 A1 | 7/2007 | Devanneaux et al. |
| 2007/0208610 A1 | 9/2007 | Pisaris-Henderson et al. |
| 2007/0256003 A1 | 11/2007 | Wagoner et al. |
| 2007/0260748 A1 | 11/2007 | Talkington |
| 2008/0005672 A1 | 1/2008 | Mestres et al. |
| 2008/0139191 A1 | 6/2008 | Melnyk et al. |
| 2008/0155425 A1 | 6/2008 | Murthy et al. |
| 2008/0195712 A1 | 8/2008 | Lin et al. |
| 2008/0228772 A1 | 9/2008 | Plamondon |
| 2008/0228911 A1 | 9/2008 | Mackey |
| 2009/0037454 A1 | 2/2009 | Sampson et al. |
| 2009/0125481 A1 | 5/2009 | Mendes da Costa et al. |
| 2009/0240698 A1 | 9/2009 | Shukla et al. |
| 2009/0241229 A1 | 9/2009 | Andersen et al. |
| 2009/0300111 A1 | 12/2009 | Rana |
| 2010/0017696 A1 | 1/2010 | Choudhary et al. |
| 2010/0149091 A1 | 6/2010 | Kota et al. |
| 2010/0169455 A1 | 7/2010 | Gorham |
| 2010/0269050 A1 | 10/2010 | Kirkby et al. |
| 2010/0281357 A1 | 11/2010 | Fu et al. |
| 2010/0299589 A1 | 11/2010 | Yamada |
| 2010/0306643 A1 | 12/2010 | Chabot et al. |
| 2011/0029641 A1 | 2/2011 | Fainberg et al. |
| 2011/0029899 A1 * | 2/2011 | Fainberg et al. .............. 715/760 |
| 2011/0066676 A1 | 3/2011 | Kleyzit et al. |
| 2011/0087966 A1 | 4/2011 | Leviathan et al. |
| 2011/0113000 A1 | 5/2011 | Marlow |
| 2011/0289486 A1 | 11/2011 | Revinskaya et al. |
| 2012/0030224 A1 | 2/2012 | Cohen et al. |
| 2012/0054595 A1 | 3/2012 | Mylroie et al. |
| 2012/0066586 A1 | 3/2012 | Shemesh |
| 2012/0079057 A1 * | 3/2012 | Fainberg et al. .............. 709/214 |
| 2012/0226766 A1 | 9/2012 | Fainberg et al. |

OTHER PUBLICATIONS

Chen, G. et al., "Building a Scalable Web Server with Global Object Space Support on Heterogeneous Clusters," Third IEEE International Conference on Cluster Computing (Cluster'01), 2001, 8 pages.

Gardner, P. et al., "DOM: Towards a Formal Specification," 2010, 6 pages.

Jansen, "Guidelines on Active Content and Mobile Code", Retrieved on Jul. 4, 2012 from http://csrc.nist.gov/publications/nistpubs/800-28-ver2/SP800-28v2.pdf, NIST Special Publication 800-28 Version 2, Mar. 2008, 62 pages.

Jing, J., et al., "Client Server Computing in Mobile Environments," ACM Computing Surveys, Jun. 1999, pp. 117-157, vol. 31, No. 2.

Mor, "Evaluation of Delivery Techniques for Dynamic Web Content", Retrieved on Jul. 2, 2012, from http://infolab.stanford.edu/~mor/research/eodposter.pdf, 2 pages.

Rayburn, "How Dynamic Site Acceleration Works, What Akamai and Cotendo Offer", Retrieved on Jul. 4, 2012 from http://blog.streamingmedia.com/the_business_of_online_vi/2010/10/how-dynamic-site-acceleration-works-what-akamai-and-cotendo-offer.html, Oct. 18, 2010, 4 pages.

Seifert, C. et al., "Identification of Malicious Web Pages with Static Heuristics," Australasian, Telecommunication Networks and Applications Conference, ATNAC 2008, 2008, pp. 91-96.

Wikipedia, "Web Accelerator", Retrieved on Jul. 4, 2012 from http://en.wikipedia.org/wiki/Web_accelerator, p. 1-3.

Bartolini, "A Walk through Content Delivery Networks", Retrieved on Jul. 4, 2012 from http://wwwusers.di.uniroma1.it/~novella/articoli/CDN_tutorial.pdf, 2012, p. 1-25.

* cited by examiner

INDISCRIMINATE VIRTUAL CONTAINERS FOR PRIORITIZED CONTENT-OBJECT DISTRIBUTION

BACKGROUND

This disclosure relates in general to responding to content requests and, but not by way of limitation, to requests for content files with embedded or referenced content objects.

Many webpages are embedded with various content objects, such as Javascript scripts, Flash animations, images, etc. When a webpage is requested, frequently, all embedded content objects are collected. This ensures that a webpage is appropriately rendered. However, such collection efforts may delay the time at which the webpage may be presented.

SUMMARY

In one embodiment, the present disclosure provides a system and method for delivering content objects over the Internet to an end user system. A request for a content file (e.g., for a HyperText Markup Language file defining a webpage) may be received from an end user system. The requested content file may be accessed and modified, such that content objects (e.g., Javascript functions) embedded or referenced within the content file are replaced by stubs, and reporting instructions are injected into the code. When a stub is invoked, the associated content object is accessed and a report is generated identifying the stub access. Based on one or more of these reports, content objects associated with a content file are prioritized. Various techniques may be implemented to improve the speed at which high-priority content objects are available to users.

In some embodiments, code or links for high-priority content objects are re-injected into the code (replacing or negating functionality of the corresponding stub). Thus, these content objects may be accessed quickly, and rendering speed is improved by not transmitting low-priority content objects. Meanwhile, low-priority content objects remain accessible via the stubs. In some embodiments, high-priority content objects are collected and cached (e.g., at an edge server of an CDN), such that they are quickly retrievable.

In some embodiments, content objects are grouped into containers, and transmission of the container data is automatically initiated upon receiving a request for the associated content file. Thus, a webpage may be initially rendered, and an increasing number of embedded or referenced content objects may be transmitted to an end user system. Content objects may be ordered within a container, such that high-priority content objects are the firs to be transmitted.

Prioritization of content objects may be applied to content objects of a variety of types. Thus, e.g., it is possible to determine a priority of a Javascript relative to an image object. Content objects of various types may thus be included in a single container and transmitted in an order based on this inter-type prioritization.

In some embodiments of the invention, a system is provided for dynamically serving a content file with embedded or referenced content objects over the Internet to an end user system. A content object request function receives a request, from the end user system, for a webpage defined by the content file, the content file including a plurality of embedded or referenced content objects. A content-file modifier modifies the content file, the content-file modifier including a reporting-code injector that injects a reporting code into the content file, the reporting code including instructions to generate one or more reports with information relating to the plurality of content objects. A report receiver receives one or more reports generated in response to implementation of the reporting code in the modified content file, the reports indicating for at least two of the plurality of content objects where the content object was rendered within the webpage. An object prioritizor prioritizes, in real time, the plurality of content objects, the prioritization depending on where the at least two of the plurality of content objects were rendered within the webpage. A delivery controller adapts, in real-time, one or more protocols for delivering at least some of the plurality of content objects to improve access to content objects assigned a high priority in the prioritization.

In some embodiments, a system is provided for dynamically serving content files with embedded or referenced content objects over the Internet to an end user system. A content object request function receives a request, from the end user system, for one or more content files associated with a webpage, the one or more content files embedding or referencing a plurality of content objects. An as-rendered locator receives data from the end user system that indicates a location of at least some of the plurality of content objects within the webpage. An object prioritizor prioritizes the plurality of content objects, the prioritization being based at least in part on the locations of the at least some of the plurality of content objects. A delivery controller adapts one or more protocols to improve access to content objects assigned a high priority, such that upon receiving a second request for the one or more content files associated with the webpage from a second end user system, the high-priority content objects are provided to the second end user system faster than they were to the end user system.

In some embodiments, a method is provided for dynamically serving content files with embedded or referenced content objects over the Internet to an end user system. A request, from the end user system, for one or more content files is received, the one or more content files embedding or referencing a plurality of content objects. Based on data received from the end user system, it is determined that a first content object of the plurality of content objects is made accessible to a user of the end user system before a second content object of the plurality of content objects is made accessible to the user of the end user system. The plurality of content objects are prioritized, such that the prioritization prioritizes the first content object over the second content object. One or more protocols for delivering at least some of the plurality of content objects are adapted to improve access to the first content object.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
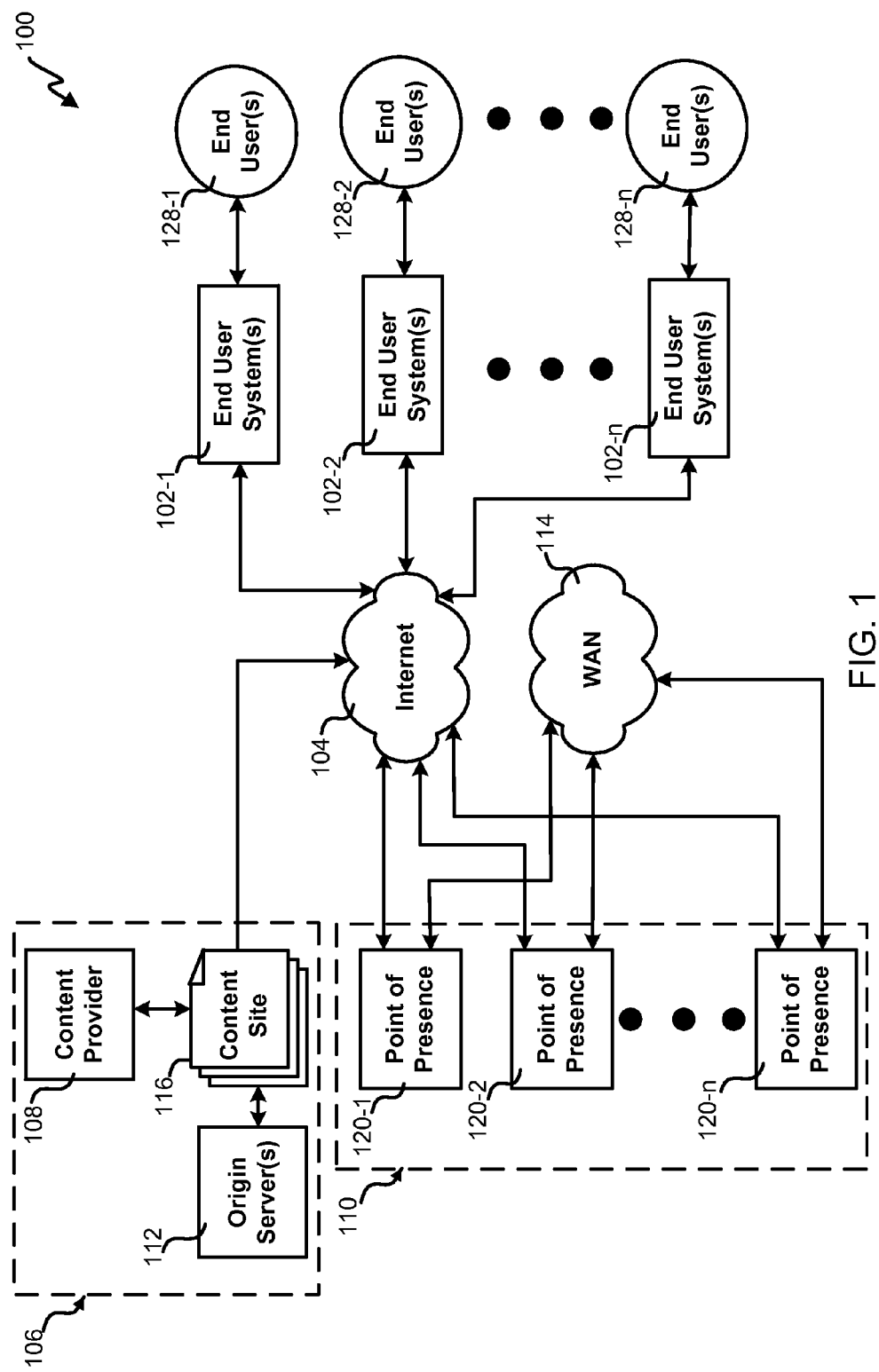
FIG. 1 depicts a block diagram of an embodiment of a content distribution system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure.

It should be understood that various changes may be made in the function and arrangement of elements without departing from the spirit and scope of the invention as set forth in the appended claims.

In one embodiment, the present disclosure provides a system and method for delivering content objects over the Internet to an end user system. A request for a content file (e.g., for a HyperText Markup Language file defining a webpage) may be received from an end user system. The requested content file may be accessed and modified, such that content objects (e.g., Javascript functions) referenced or embedded within the content file are replaced by stubs, and reporting instructions are injected into the code. When a stub is invoked, the associated content object is accessed and a report is generated identifying the stub access. Based on one or more of these reports, content objects associated with a content file are prioritized. Various techniques may be implemented to improve the speed at which high-priority content objects are available to users.

In some embodiments, code or links for high-priority content objects are re-injected into the code (replacing or negating functionality of the corresponding stub). Thus, these content objects may be accessed quickly, and rendering speed is improved by not transmitting low-priority content objects. Meanwhile, low-priority content objects remain accessible via the stubs. In some embodiments, high-priority content objects are collected and cached (e.g., at an edge server of an CDN), such that they are quickly retrievable.

In some embodiments, content objects are grouped into containers, and transmission of the container data is automatically initiated upon receiving a request for the associated content file. Thus, a webpage may be initially rendered, and an increasing number of embedded or referenced content objects may be transmitted to an end user system. Content objects may be ordered within a container, such that high-priority content objects are the first to be transmitted. Prioritization of content objects may be applied to content objects of a variety of types. Thus, e.g., it is possible to determine a priority of a Javascript relative to an image. Content objects of various types may thus be included in a single container and transmitted in an order based on this inter-type prioritization.

Referring first to FIG. 1, a block diagram of an embodiment of a content distribution system 100 is shown where a content originator 106 offloads delivery of the content objects to a content delivery network (CDN) 110. In this embodiment, the content distribution system 100 can dynamically and efficiently serve objects (e.g., Javascript scripts, images, videos, Flash animations, etc.) over the Internet 104 to end user systems 102 by determining usage patterns and differentially providing objects in view of the patterns. For example, objects generally used frequently or quickly after loading a webpage may be provided to users before objects generally used less frequently and/or later. As another example, objects used frequently may be automatically provided after a request for an associated webpage, whereas objects used infrequently may be provided only upon subsequent request for the object. In this way, frequently and/or quickly accessed objects are quickly provided to users and access to these objects is not slowed by transmitting objects accessed less frequently and/or accessed after a delay.

In some embodiments, content distribution system 100 may further dynamically and efficiently serve webpage-code portions, style sheet portions or style sheets (e.g., a Cascading Style Sheet). For example, a webpage code (e.g., an HTML code) may be reorganized such that code producing webpage portions first used or viewed are presented immediately or towards a top of a code and other portions are embedded into the webpage, served subsequently and/or towards a bottom of a code. As another example, style sheets affecting a first-used or first-viewed portion of a webpage may be quickly available to a user system, and other style sheets may be subsequently provided. Thus, embodiments that relate to determining how quickly a content object is used or viewed and improving the probability that quickly used or viewed content objects are quickly available to user systems may be extended to HTML code portions, HTML codes, style sheet portions, and style sheets.

An end user may request a set of content object, e.g., by requesting a webpage associated with the set of content objects. For example, a user may request a file, such as a Hypertext Markup Language (HTML) file. The requested file may include multiple code portions, calls to multiple style sheets, and/or code that references or embed sa plurality of objects (e.g., including content objects, HTML code, etc.). For example, the file may include tags and code to embed an internal or external object (e.g., a Javascript function) or libraries of objects into the file. A source of each of the content objects and/or the file may be on an edge server or any other server within the CDN.

If an end user system retrieves all of the embedded and referenced objects before responding to the user's request, the response may be relatively slow and a substantial amount of bandwidth may be consumed. However, if an end user system does not retrieve all of the embedded and referenced objects before responding to the user's request, an object may be unavailable to display or run at an appropriate time. Thus, as described in greater detail below, embodiments of the present invention relate to differentially and/or selectively hastening the providing of embedded and referenced objects to an end user system based on predicted usage of the objects.

A content originator 106 produces and/or distributes content objects as the originator of content in a digital form for distribution with the Internet 104. Included in the content originator 106 are a content provider 108, a content site 116 and an origin server 112. The figure shows a single origin server 112, but it is to be understood embodiments could have multiple origin servers 112 that each can serve streams of the content object redundantly. For example, the content originator 106 could have multiple origin servers 112 and assign any number of them to serve the content object.

Although, this figure only shows a single content originator 106 and a single CDN 110, there may be many of each in other embodiments. The content object is any content file or content stream and could include, for example, video, pictures, advertisements, script, data, audio, software, and/or text. The content object could be live, delayed or stored. Throughout the specification, references may be made to a content object, content, and/or content file, but it is to be understood that those terms could be generally used interchangeably wherever they may appear.

Many content providers 108 use the CDN 110 to deliver the content objects over the Internet 104 to end users 128. When a content object is requested by an end user 128, the CDN 110 may retrieve the content object from the content provider 108. Alternatively, the content provider 108 may directly provide the content object to the CDN 110, i.e., in advance of the first request or in servicing the first request. In this embodiment, the content objects are provided to the CDN 110 through caching and/or pre-population algorithms and stored in one or more servers such that requests may be served from the CDN 110. The origin server 112 holds a copy of each content object for the content originator 106. Periodically, the contents of the origin server 112 may be reconciled with the CDNs 110 through a cache and/or pre-population algorithm. Some embodiments could populate the CDN 110 with content objects without having an accessible origin server such that the CDN serves as the origin server, a host or a mirror.

The CDN 110 includes a number of points of presence (POPs) 120, which are geographically distributed through the content distribution system 100. Various embodiments may have any number of POPs 120 within the CDN 110 that are generally distributed in various locations around the Internet 104 to be proximate, in a network quality of service (QoS) sense, to end user systems 102. A wide area network (WAN) 114 or other backbone may couple the POPs 120 with each other and also couple the POPs 120 with other parts of the CDN 110. Other embodiments could couple POPs 120 together with the Internet optionally using encrypted tunneling.

When an end user 128 requests a content link through its respective end user system 102, the request for the content is passed either directly or indirectly via the Internet 104 to the content originator 106. The request for content, for example, could be an HTTP Get command sent to an IP address of the content originator 106 after a look-up that finds the IP address. The content originator 106 is the source or re-distributor of content objects. The content site 116 is accessed through a content web site 116 in this embodiment by the end user system 102. In one embodiment, the content site 116 could be a web site where the content is viewable by a web browser. In other embodiments, the content site 116 could be accessible with application software other than a web browser. The content provider 108 can redirect content requests to any CDN 110 after they are made or can formulate the delivery path beforehand when the web page is formulated to point to the CDN 110. In any event, the request for content is handed over to the CDN 110 for fulfillment in this embodiment.

Once the request for content is passed to the CDN 110, the request is associated with a particular POP 120 within the CDN 110. A routing algorithm used to choose between different POPs 120 could be based upon efficiency, randomness, and/or proximity in Internet terms, defined by the fabric of the Internet and/or some other mechanism. The particular POP 120 then assigns or routes the request to an edge server. The particular POP 120 may retrieve the portion of the content object from the content provider 108. Alternatively, the content provider 108 may directly provide the content object to the CDN 110 and its associated POPs 120, i.e., in advance of the first request. In this embodiment, the content objects are provided to the CDN 110 and stored in one or more CDN servers such that the portion of the requested content may be served from the CDN 110. The origin server 112 holds one copy of each content object for the content originator 106. Periodically, the content of the origin server 112 may be reconciled with the CDN 110 through a cache, hosting and/or pre-population algorithm.

An edge server serving the request may access the requested content—either by locally retrieving part or all of the content or requesting it from another server. In some instances, the edge server determines a source for part or all of the requested content within the CDN 110 by querying other peer servers within or remote from the particular POP 120. This embodiment dynamically discovers peer servers, which have already cached or stored the requested content. The peer server that already holds the requested content could be an edge server or a server that doesn't service end user requests, for example, a relay server or ingest server. If part or all of the content cannot be found in the POP 120 originally receiving the request, neighboring POPs 120 could serve as the source in some cases, or the content could be sourced from the content originator 106.

Thus, a request from an end user system 102 for content may result in requests for content from one or more servers in the CDN 110. A CDN server (e.g., an edge server, peer servers, an origin server, etc.) may analyze requested content objects (e.g., requested HTML files), modify the requested content objects (e.g., to include reporting instructions, HTML stub wrappers, etc.), and transmit the modified requested content objects in response to the requests.

The end user system 102 processes the content for the end user 128 upon receipt of the content object. The end user system 102 could be a personal computer, media player, handheld computer Internet appliance, phone, IPTV set top, streaming radio or any other device that can receive and play content objects. In some embodiments, a number of end user systems 102 can be networked together sharing a single connection to the Internet 104. Although this embodiment only shows a single content originator 106 and a single CDN 110, it is to be understood that there could be many of each in various embodiments.

Figure 2:
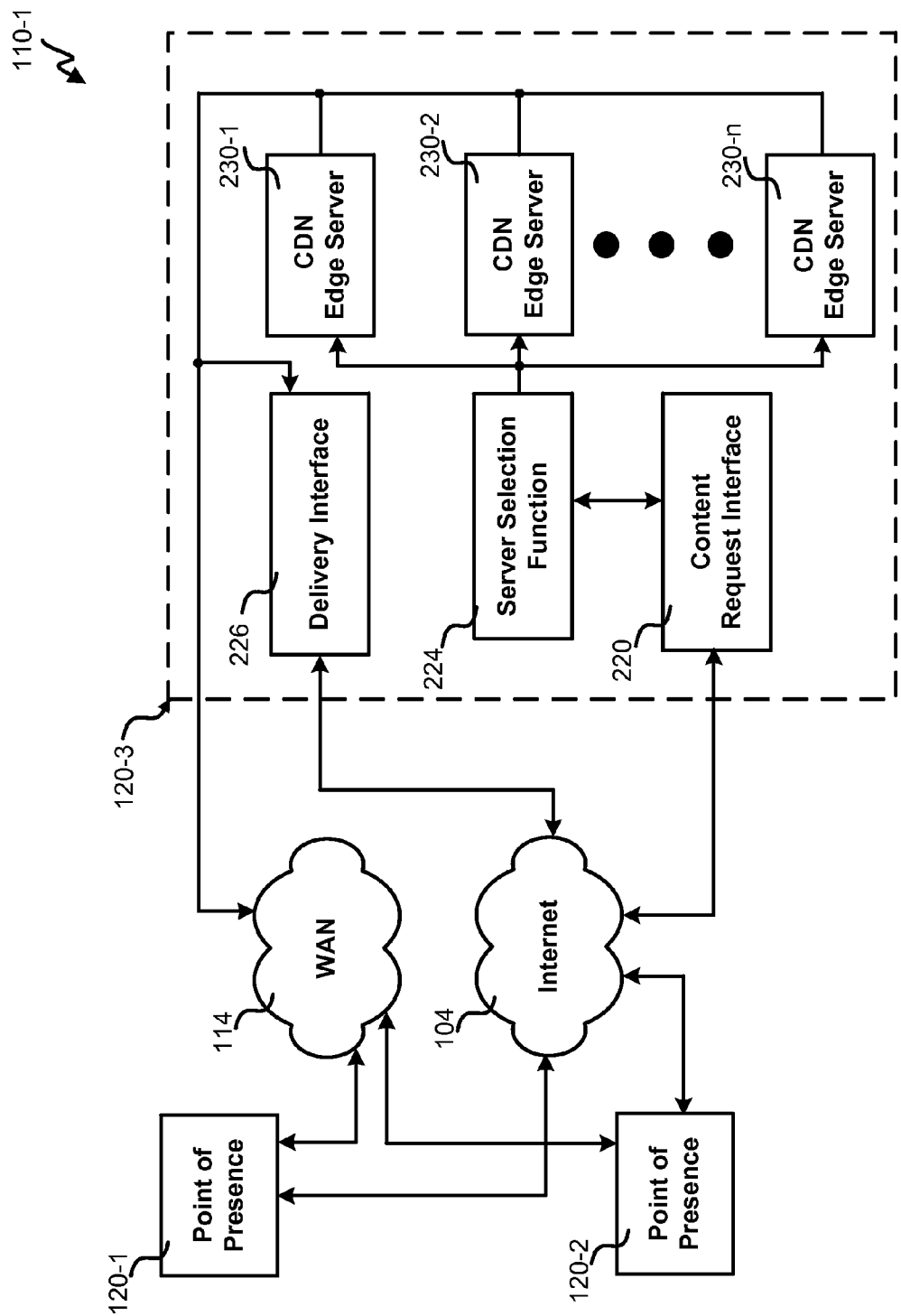
FIG. 2 depicts block diagrams of embodiments of a content delivery network (CDN) coupled to the Internet.

Referring next to FIG. 2, a block diagram of an embodiment of the CDN 110-1 is shown coupled to the Internet 104 with additional detail for one of the POPs 120. Each POP 120 may include a content request interface 220, a server selection function 224, a delivery interface 226, a number of CDN edge servers 230, and other servers (not shown). For simplicity, this embodiment only shows three POPs 120 within the CDN 110, however any number of POPs may exist in various embodiments.

As explained above in relation to FIG. 1, when a request for content is handed over to the CDN 110, the request is associated with a particular POP 120 within the CDN 110 using any number of algorithms. For example, the assignment could be round-robin, random, based upon loading of the edge server, distance between POP and end user, and/or other algorithms. The particular POP 120 receives the request through a content request interface 220 and distributes the request to the server selection function 224. The server selection function 224 assigns the request for content to an edge server 230 to stream the content object to the end user system 102. The server selection function 224 selects the edge server 230 from a group of edge servers 230 in the POP 120. A number of algorithms can be used to assign the request to an edge server 230. For example, the server selection function 224 may use routing algorithms, domain name service (DNS) resolution or an HTTP-redirect to direct a particular end user system 102 to a particular edge server 230.

Various parameters may be taken into account for selection of the edge server 230. Examples of parameters influencing selection of the particular edge server may include content object characteristics, server assignment to a particular content provider, adequate quality of service (QoS), performance metrics, capabilities of the edge server 230, and/or routing efficiency between the edge server 230 and end user system 102. Embodiments could have any number of edge servers 230 within each POP 120 of the CDN 110.

When the request for content is assigned to the edge server 230, the edge server 230 may determine a source for part of all of the requested object (e.g., a content file and/or embedded or referenced content objects). The content source(s) may be determined using one or more techniques. For example, a publishing point mapping content to one or more paths where the content can be found may be identified and/or a peer-discovery algorithm may be implemented. In some embodiments, a content source may be determined by, e.g., querying a content registrar or distributed registrar. The content registrar may receive reports from edge servers in a plurality of POPs, and the distributed registrar may receive reports from edge servers in a particular POP. One or both registrars may be queried to identify where content is stored within the CDN. The content source(s) may include, e.g., the edge server 230 itself, a peer server or the content provider 108 or any other server with the content.

Some embodiments select one of the edge servers 230 to serve a particular content object for all requests in the POP 120. Where the edge server 230 receiving the request serves the content from a source external to its POP, like the content provider 108 or another POP 120, the edge server 230 would become the master for its POP 120 such that other edge servers 230 in the same POP would use the master edge server 230 found during peer discovery rather than getting the content externally. Other edge servers 230 receiving a request for the content object would find the master edge server 230 using peer discovery.

Although this embodiment chooses a single edge server 230 other embodiments could assign the same content object request to multiple edge servers 230 on different occasions. To balance the load, for example, a variable number of edge servers 230 could be selected for a particular request such that they shared the delivery load. An edge server 230 without a particular content object could act as a relay to get the content object from a peer or neighboring edge server. The number of relay edge servers for a group of content object requests is configurable based on a number of factors, for example, stream name, customer name, service type, customer preference, number of edge servers, loading of edge servers, etc.

Figure 3:
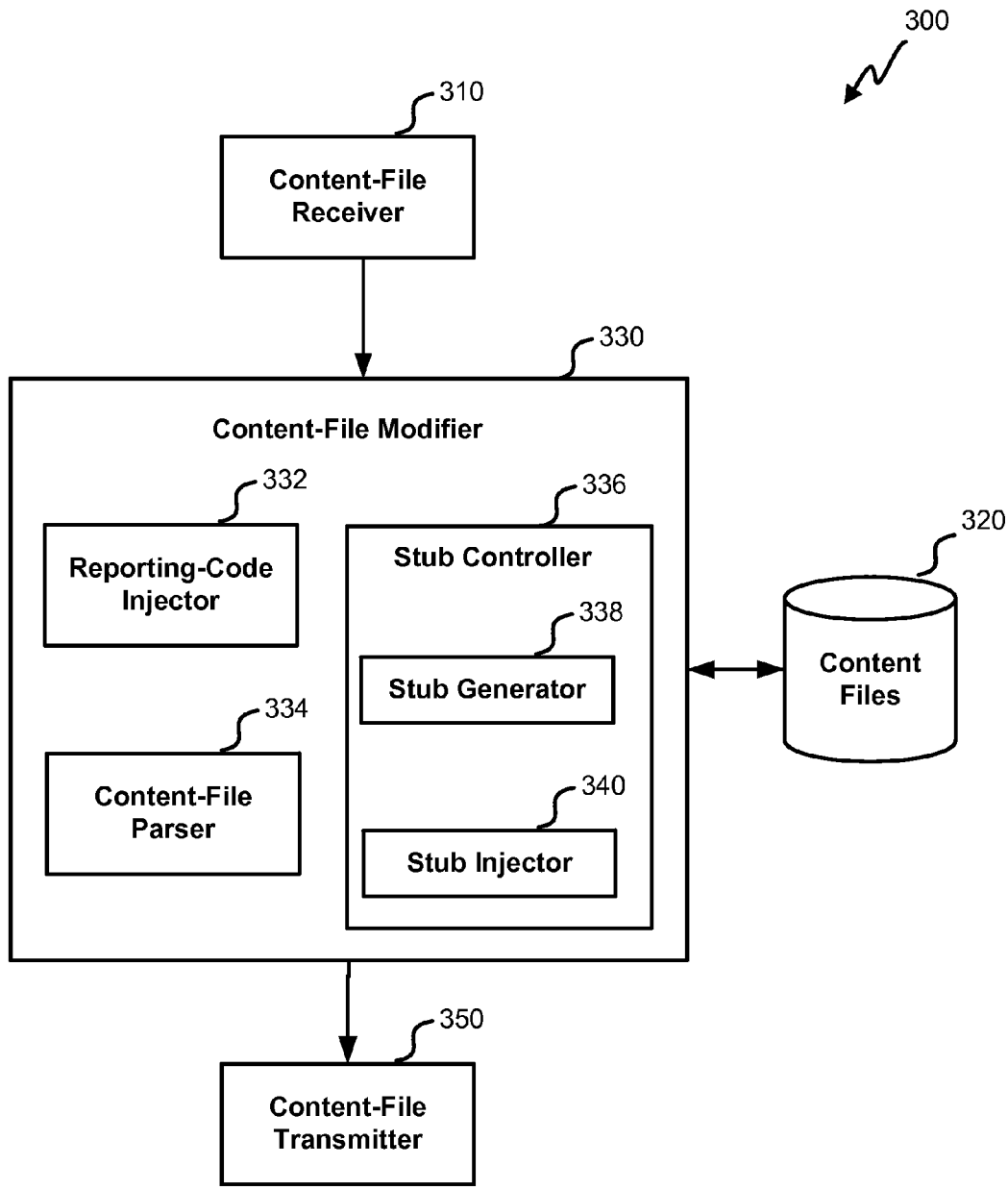
FIG. 3 depicts a block diagram of an embodiment of content-modifying system.

Referring next to FIG. 3, a block diagram of an embodiment of content-modifying system 300 is shown. Any of a variety of components in the content distribution system 100 may include and/or be coupled to the content-modifying system 300. For example, in some instances, a content-modifying system 300 is implemented by one, more or each of a plurality of edge servers 230 (e.g., that respond to requests from users 128) at one, more or each of a plurality of POPs 120. Other implementations are possible. For example, the content-modifying system 300 may be implemented by the origin server(s) 112, by one or more end user system(s) 102, by a server coupled to a plurality of edge servers 230 (e.g., at a POP), by a server coupled to a plurality of POPs 120, etc. In some instance, the content distribution system 100 includes a plurality of content-modifying systems, which may or may not be located in parallel locations (e.g., at a plurality of edge servers or at an edge server and at an origin server).

Content-modifying system 300 includes a content-file receiver 310. Content-file receiver receives a content file. In some instances, content-file receiver 310 requests the content file (e.g., from an origin server) and receives the content file in response to the request. The content-file receiver 310 may request the content file, e.g., upon detecting a request for the file and/or determining that the requested content file is not stored in a content-files database 320. A "content file", as used herein, may refer to a single file or a set of files. For example, a single HTML file may call or include additional files (e.g., style-sheet files and HTML files). A "content file" may thus, e.g., include all (e.g., markup and/or style-sheet) files included and cooperating to render content.

In some instances, content-file receiver 310 receives the content file by intercepting the content file while the content file is being transmitted to another location. Thus, for example, an edge server 230 may have requested the content file from an origin server, and a content-file receiver 310 of a content-modifying system 300 separate from the edge server 230 may detect a response to the request and intercept the content file.

In some instances, a content file is accessed from the content-file database 320. The content-file database 320 may include original and/or modified content files. Original and/or modified content files may be associated with storage locations, naming conventions, associated identifiers (e.g., in the content file or in an index of content files), etc. in order to convey a modification status. The content-file database 320 may or may not be stored locally with respect to the content-file modifier 330. In some instances, one or more content-file databases 320 are located at each of a plurality of edge servers.

The content file may include a file written in a markup language (e.g., HTML) and/or a style-sheet language (e.g., Cascading Style Sheets). The content file may include one or more embedded or referenced content objects.

A content-file modifier 330 modifies a content file (accessed via the content-file receiver or the content-file database 320). The content file may comprise a code, such as a code written in a markup language (e.g., HTML). The content file may be modified prior to a compiling of the content file. The content file may comprise a single file or a set of files. The content file may comprise a webpage-defining file.

The content-file modifier includes a reporting-code injector 332, which injects a reporting code into the content file. The reporting code may include a reporting destination, reporting conditions and/or reporting protocols. For example, the reporting code may include instructions to send a report each time or a first time that a particular function is called, a type of function is called, specific/general content identified in the content file is retrieved from an external source, etc. Reporting protocols may include a requested frequency of reports. For example, reports may be sent every time one, more, a set or a threshold number of conditions are fulfilled; at fixed intervals but only when one, more, a set or a threshold number of conditions are fulfilled; at fixed intervals irrespective of condition fulfillment; etc. The reporting code may be injected, e.g., towards a beginning of the content file, near calls to functions, near embedded or referenced objects, etc.

The content-file modifier 330 includes a content-file parser 334, which parses the content file to identify one or more objects (e.g., embedded content objects, referenced content objects, code portions, included style sheets, etc.). For example, the content-file parser 334 may identify embedded Javascript scripts (e.g., by scanning for script tags), Flash animations, images, embedded links, etc. The objects may comprise, e.g., objects internal to the content file, external to the content file but associated with a same domain name as the content file (e.g., a link to a local image), or external to the content file and a hosting server.

The content-file parser 334 may communicate with a stub controller 336. Operations of the content-file parser 334 may be sequential (e.g., the content-file parser 334 first identifying all objects and the stub controller 336 then generating and/or injecting stubs) or not (e.g., the content-file parser 334 identifying one or a subset of objects, the stub controller 336 generating and/or injecting stubs for the identified objects, the content-file parser 334 identifying another or another subset of objects, etc.).

After an content-file object is identified by the content-file parser 334, the stub controller 336 injects a stub into the content file or modifies an existing stub in the content file for the identified object. As used herein, a stub comprises a local piece of code that, when implemented, forwards a request for an object to a server and receive a response to the request. Thus, for example, a stub may request implementation of a remote Javascript, receive the response, and present the response to a requesting user via, e.g., a webpage defined by the content file. As another example, a stub may request an image from a remote source, download the requested image, and present the image to a requesting user via, e.g., a webpage defined by the content file. A stub can be associated with (e.g., replace or represent), e.g., a whole script file, a part of a script file, one function, multiple functions, a part of a function, one object, or a part of an object.

Implementing the stub, therefore, comprises accessing a remote resource (e.g., using a remote Javascript script, accessing a remote image file, etc.) and presenting either the remote resource or a result of the remote resource to a user. Thus, the user is unaware that the resource is remote and there is little to no functional content consequence of using a stub. However, because the accessed resource is remote, using a stub may delay presentations of content to a user.

The stub may be configured to marshal data (e.g., parameters passed to a remote server) and/or unmarshal data (e.g., in a received response to the request). The stub may comprise a Javascript. The stub may be in communication with a skeleton which retrieves the requested object and transmit the requested object to the stub.

In some instances, one, more or all stubs comprise or are associated with a reporting feature. For example, the stub may include a piece of code which automatically transmits a report when the stub is called. As another example, the stub may be associated with a skeleton that transmits a report when the skeleton is called. In some instances, reporting features are not specifically integrated into a stub and/or skeleton, but the reporting code injected by the reporting-code injector 332 may determine when specific stubs or stubs generally were called and report such calls.

In some instances, the injected reporting code or "null" stubs serve to identify when particular content objects are viewed or executed, but no request is sent for the content object. For example, a "null" stub or marker may be associated various HTML portions of a webpage code. When a user views or uses an associated webpage portion, a report may be generated and transmitted.

The stub controller 336 comprises a stub generator 338 configured to generate one or more stubs. In some instances, one stub is associated with each content object, or each content object of a particular type (e.g., a Javascript, image, HTML portion, etc.) identified by the content-file parser. The stub generator 338 may generate a stub, e.g., by generating another object (e.g., Javascript). In some instances, the stub generator 338 may further be configured to generate code to display placeholder content (e.g., stored locally) while the stub is collecting the requested content. For example, a placeholder small image file may be generated and/or associated with one or more content objects.

The stub controller 336 further includes a stub injector 340. The stub injector 340 injects the generated code into the content file. Injecting the stub may include replacing a portion of the content file with the stub. For example, a function in the content file may be replaced with a stub. In some instances, injecting a stub comprises injecting and/or modifying code in one or more files other than the content file. For example, a skeleton code corresponding to a stub may be generated to be stored in another file and/or at another server.

The modified content file may be stored, e.g., in a content-file database (such as content-file database 320) at an end user system, at a POP, at an edge server, at an origin server, etc. The modified content file may be stored in a local or remote location. For example, an edge server may comprise the content-modifying system 300 and the modified content file may be stored locally. As another example, a server between an origin server and an edge server may comprise the content-modifying system 300 and the modified content file may be stored at the edge server. In some instances, multiple versions of the modified content file are saved. For example, the modified content file may be generated at or near the origin server, and copies of the modified content file may then be stored at a plurality of (or each) POP within a CDN or at a plurality of (or each) edge server within a CDN. Copies may then be revised independently from each other and/or in a global manner.

A content-file transmitter 350 transmits the modified content file. The modified content file may be transmitted, e.g., to a POP, to an edge server, to an end user system, etc.

Figure 4:
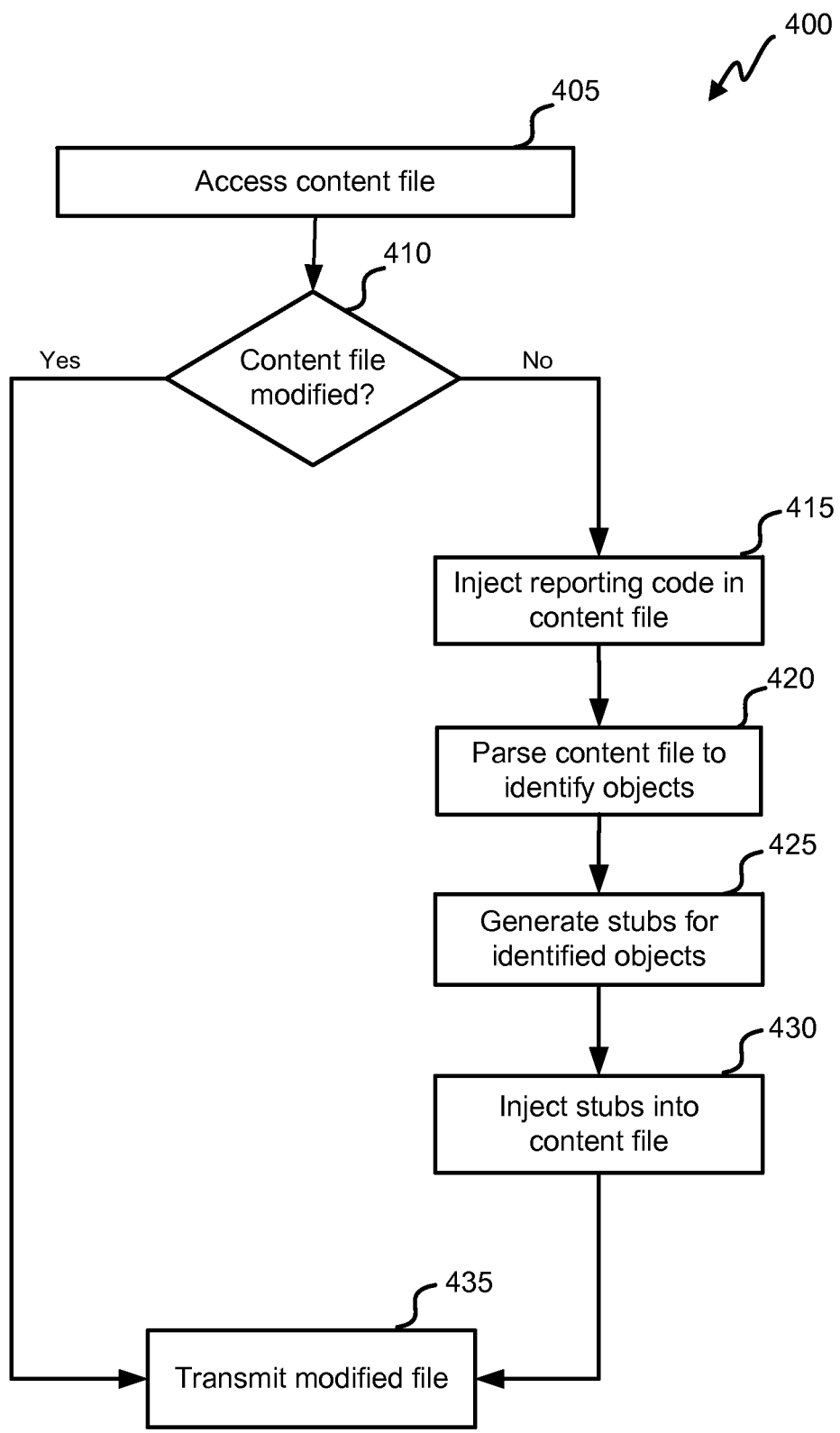
FIG. 4 illustrates a flowchart of an embodiment of a process for generating a modified content file.

With reference to FIG. 4, a flow diagram of an embodiment of a process 400 for generating a modified content file is shown. The depicted portion of the process begins in step 405 where the content-file modifier 330 accesses one or more content files (e.g., received by the content-file receiver 310 or accessed from a content-file database 320). A determination is made, at block 410, as to whether the accessed content file is modified. For example, a determination may be made as to whether the content file comprises one or more usage-related reporting codes, whether one or more stubs are associated with the file, whether a modification identifier is associated with the file, etc. If the content file is modified, then the process continues to block 435, and the modified file is transmitted by the content-file transmitter 350 (e.g., to an edge server, end user system, etc.).

If the content file is not modified, then processing continues to block 415, at which reporting code is injected into the content file by the reporting-code injector 332. The content-file parser 334 parses the content file, at block 420, to identify one or more content objects. Based on the identified content objects, a stub generator 338 generates one or more stubs for each identified object at block 425, and a stub injector 340 injects the stubs into the content file at block 430. Thus, the content file is modified to include one or more stubs that invoke remote resources and further include reporting functionality such that reports are generated and transmitted to indicate, e.g., which stubs are implemented and when they are implemented. The modified content file is then transmitted by the content-file transmitter 350 (e.g., to an edge server, end user system, etc.) at block 435.

Figure 5:
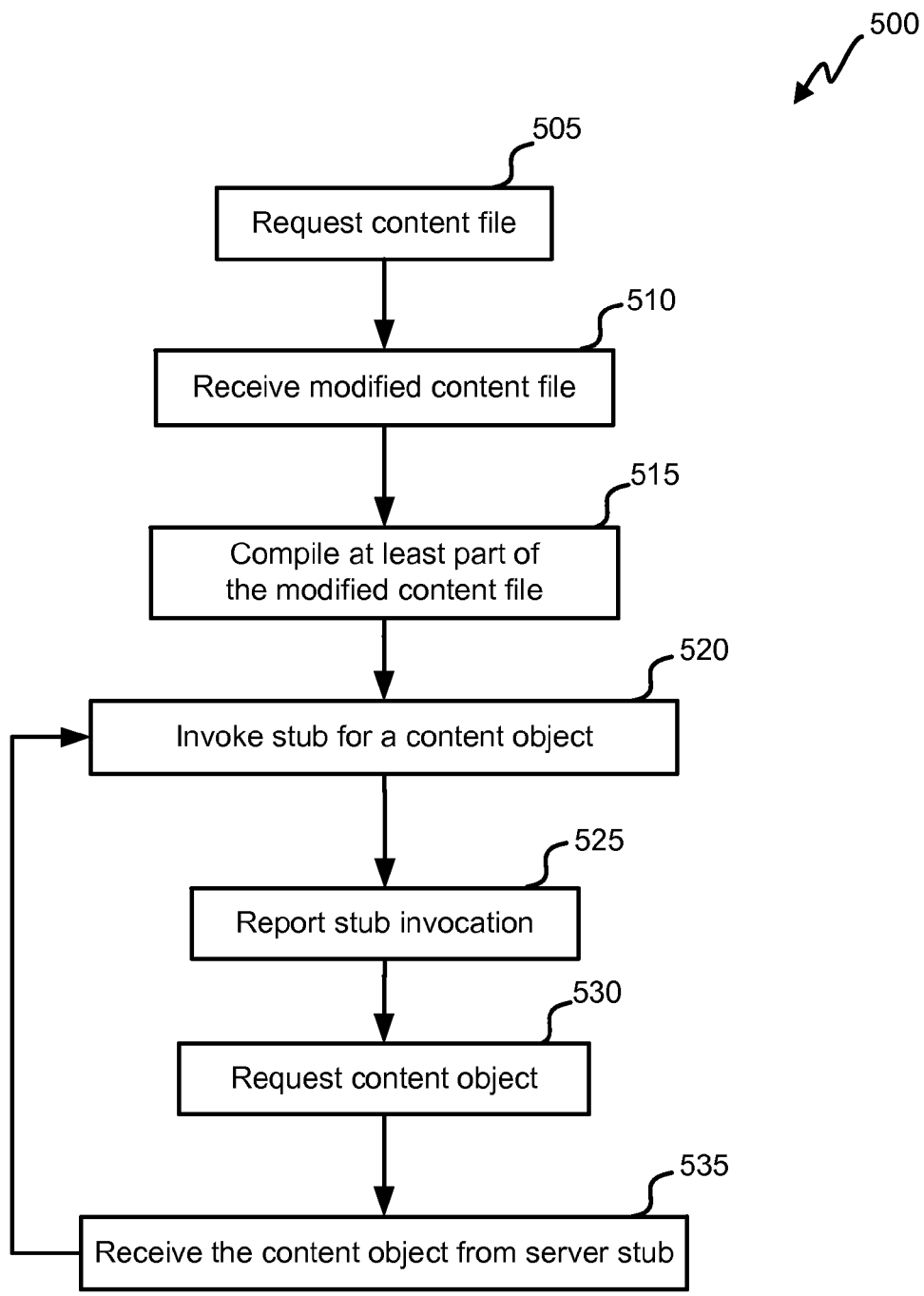
FIG. 5 illustrates a flowchart of an embodiment of a process for accessing content.

With reference to FIG. 5, a flow diagram of an embodiment of a process 500 for accessing content is shown. The depicted portion of the process begins in step 505 where a content file (e.g., a webpage) is requested. For example, an user 128 may enter a uniform resource locator (URL), click on a hypertext link, etc. The request may be transmitted, e.g., from an end user system 102 associated with the user 128 over a network (e.g., the Internet 104) to a POP 120. The request may be assigned to an edge server 230 at the POP.

In response to the request, a modified content file may be received by an end user system 102. For example, an edge server 230 may receive and modify the requested content file in accordance with process 400 depicted in FIG. 4 and transmit the file to the end user system 102, or an origin server may access and modify the requested content file in accordance with process 400 depicted in FIG. 4 and transmit the file to the end user system 102 via an edge server. In some instances, the end user system 102 receives an unmodified content file and itself modifies the file, e.g., in accordance with process 400 depicted in FIG. 4.

At block 515, the end user system 102 compiles at least part of the modified content file. At block 520, a stub for a content object is invoked. For example, a user may attempt to interact with an applet or application, or a webpage may attempt to display an image. At block 525, the stub invocation is reported. For example, the occurrence of the stub invocation, a time (e.g., relative to a request time, page-loading time, etc.) of the invocation, a result of the invocation (e.g., a response time), may be reported. In some instances, a report includes data about invocations of multiple stubs. Thus, generation and/or transmission of reports may be delayed, e.g., until a user has left a webpage.

At block 530, the stub requests the content object or a result from the content object. For example, the stub may request that a Javascript script compute a result based on user inputs, or the stub may request that the content object (e.g., an application or file) be delivered. The request may be sent, e.g., to a remote server, such as a server that provided the modified content file, an edge server, an origin server, etc. The request may be sent to a server that is within a same CDN as the requesting end user system 102 or outside CDN of the requesting user system 102.

In some instances, process 500 does not include block 520 and/or blocks 530-535. For example, a reporting code in the modified content file may instruct the end user system 102 to report use of a content object (e.g., viewing a webpage portion associated with an HTML code portion or viewing a webpage portion affected by a style sheet), or null stubs may be inserted to report the use of a content object. In these embodiments, the used or viewed content object may already be available to end user system 102, such that it need not be requested.

In some instances, the request is sent to a skeleton (on a remote server, such as an edge server serving the content-file request)) associated with the invoked stub. The skeleton may then obtain the requested content object or result from the content object (e.g., from an origin server or CDN-external source). At block 535, the content object or result from the content object is received from the stub. The content object or the result from the content object may be presented to the user 128. Blocks 520-535 may be repeated as other stubs are invoked.

Figure 6:
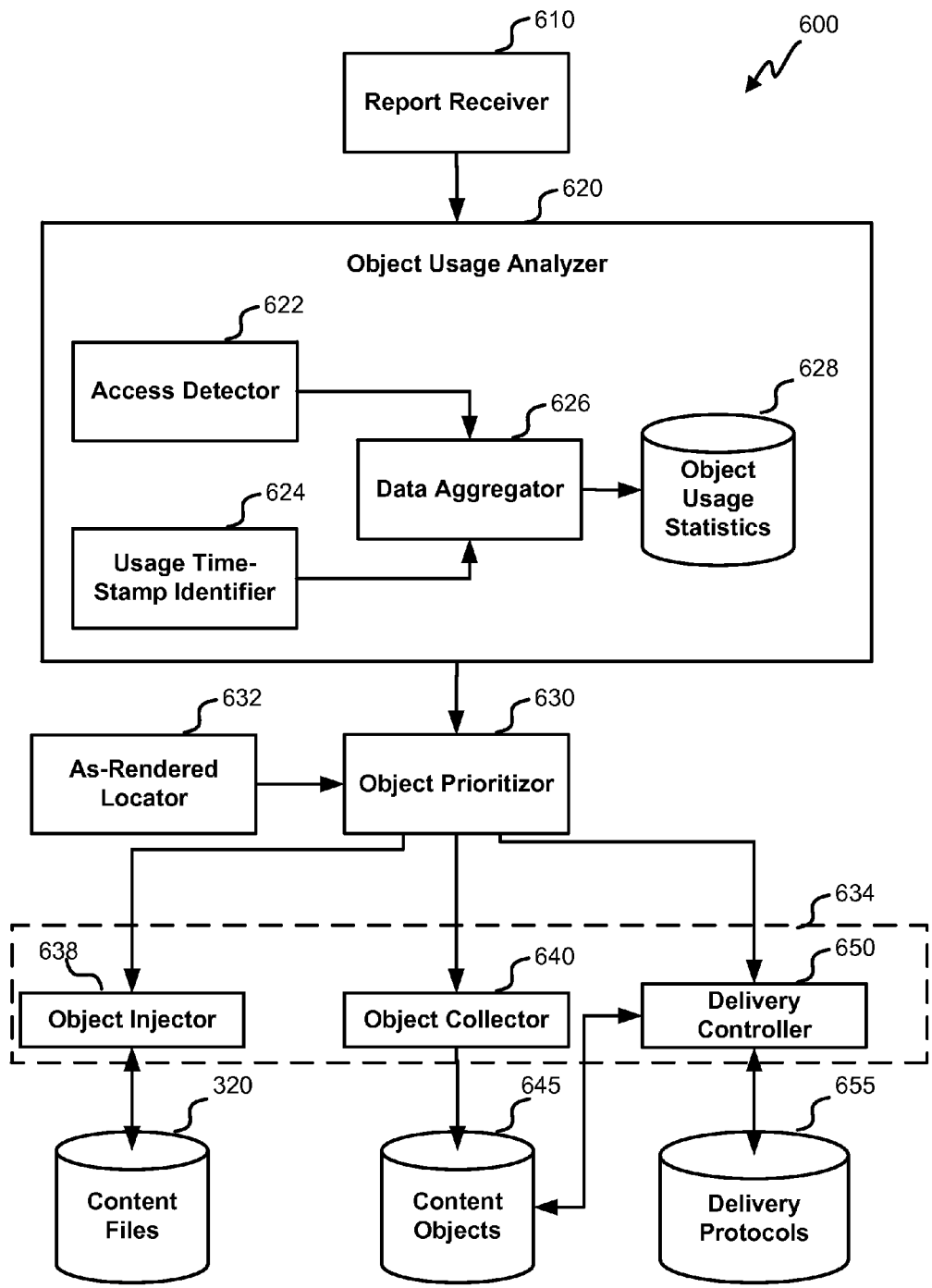
FIG. 6 depicts a block diagram of an embodiment of an object-delivery system.

Referring next to FIG. 6, a block diagram of an embodiment of an object-delivery system 600 for is shown. Any of a variety of components in the content distribution system 100 may include and/or be coupled to the object-delivery system 600. For example, in some instances, an object-delivery system 600 is implemented by each of a plurality of edge servers 230 (e.g., that respond to requests from users 128) at each of a plurality of POPs 120. Other implementations are possible. For example, the object-delivery system 600 may be implemented by the origin server(s) 112, by one or more end user system(s) 102, by a server coupled to a plurality of edge servers 230 (e.g., at a POP), by a server coupled to a plurality of POPs 120, etc. In some instance, the content distribution system 100 includes a plurality of object-delivery systems 600, which may or may not be located in parallel locations (e.g., at a plurality of edge servers or at an edge server and at an origin server).

The object-delivery system 600 includes a report receiver 610, which receives reports regarding usage patterns as they pertain to one or more content files. The reports may indicate, e.g., requested and/or actual access to one or more content objects embedded or referenced in a content file, viewing a portion of a webpage affected by an HTML code portion or style sheet portion, and/or use of a stub associated with a content object. The reports may include, e.g., one or more time stamps, such as a time stamp associated with: a request for a content file, with receipt of the content file, display of a webpage associated with the content file to a user, use of a stub, a call made by a stub, a reply sent in response to a stub request, etc. The time stamp may include an absolute time or a relative time (e.g., relative to a time of a request for the content file). The reports may include details about an end-user system, such as a browser used to display content in the content file, an operating system, a type of device, etc. Reports may be received from one or more users 102 and/or end user systems 128. In some embodiments, end user systems 128 that were served the content file (or a modified version thereof) from an edge server or from an origin server (e.g., via an edge server) send reports to the edge server 230 or to the origin server 112. Reports may also be received from parallel or higher level network components. For example, a report receiver 610 at a first edge server 230-1 may receive reports from a second edge server 230-2 (which may have received the reports from an end-user system 102).

Thus, in some instances, reports may be generated by and received (directly or indirectly) from end user systems 128. In some instances, reports are additionally or alternatively generated by and received from other servers. For example, a skeleton residing on a server remote from an end user system may generate a report after being called by a corresponding stub or after responding to a call from a corresponding stub.

The object-delivery system 600 includes an object usage analyzer 620, which analyzes the reports received by the report receiver 610. For each of a plurality of content objects (e.g., each content object embedded or referenced in a content file, contributing to a content file, being called by a content file, associated with a stub in a modified version of the content file, etc.), the object usage analyzer 620 may determine whether, how frequently, when and/or how the content object was accessed.

An access detector 622 may determine whether a content object associated with a content file was accessed generally or within a particular time period. Access to the content object may be in the received reports or may be inferred based on data in the reports. For example, the access detector 622 may detect access to a content object when a stub associated with the content object requested a content object or a result from the content object.

A usage time-stamp identifier 624 may determine temporal information related to access of the content object. For example, the usage time-stamp identifier 624 may identify an absolute time of access of a content object or a relative time of access of a content object (e.g., relative to a display of a corresponding webpage, request for the content file, etc.). The usage time-stamp identifier 624 may identify an order of access to content objects. For example, a user may have accessed Content Object #1 first, Content Object #5 second, and Content Object #10 third.

Outputs from the access detector 622 and/or from the usage time-stamp identifier 624 may be aggregated across reports by the data aggregator 626. Data aggregator 626 may determine, e.g., outputs corresponding to a same or similar content file (e.g., being generated based on data from one or more reports) and aggregate the data. Thus, for example, the aggregated data may include data received from reports generated from a plurality of end user systems 128. The data may be aggregated, e.g., in a cumulative manner or in a time-binned manner.

One or more object usage statistics, stored in an object-usage-statistics database 628, may be generated based on the aggregated data. The object usage statistics may or may not include variables specific to a same or similar content file (e.g., URL). The object usage statistics may be specific to content objects. The object usage statistics may indicate, e.g., a frequency at which a content object was accessed, information pertaining to a relative time at which the content object was accessed (e.g., a mean time of access with respect to a time of a request for an associated content file), dependencies on locality or end-user-system variables (e.g., browsers, edge server locations, etc.), etc.

Based at least partly on the analysis performed by the object usage analyzer 620, an object prioritizor 630 then prioritizes content objects. The prioritization may include ranking at least two of the content objects, assigning the content objects to groups based on priorities, etc.

In one instance, the prioritization comprises identifying one or more rarely-requested content objects. The rarely-requested content objects may comprise content objects associated with statistics identifying a low count of accesses and/or a low frequency of accesses. Thus, a count or frequency of access may be compared to an absolute threshold (e.g., identifying content objects requested fewer than 50 times or fewer than 50 times per month). A count or frequency of access may be compared to a relative threshold (e.g., identifying content objects for which access counts were less than 5% as compared to a maximum access count; identifying content objects for which access counts' contribution to a content-file's total access to count to all content objects was less than 1%, identifying content objects that were not amongst the top 20 most requested content objects, etc.). In one instance, the prioritization comprises determining which content objects are accessed quickly and which content objects are accessed after a delay.

Generally, frequently requested content objects may be prioritized over rarely requested content objects, and quickly accessed content objects may be prioritized over content objects accessed after a delay. However, other factors may further influence prioritization, such as: size of content objects, bandwidth consumption of transmitting the content object, estimated download time associated with the content object, use of a content object in multiple content files, popularity of an associated content file, etc.

In some instances, the prioritization depends at least partly on an actual or predicted location of one or more content objects within a webpage as rendered. For example, a reporting code in a modified content file may instruct an end user system to collect (in a raw or processed form) information about a location of one or more content objects (e.g., including those defined inside iframes) with respect to a rendered, e.g., webpage. The information may be transmitted in a raw or processed form to an as-rendered locator 632. The information may itself comprise location estimates or the as-rendered locator 632 may estimate locations based on the data. Objects may be prioritized at least in part based upon the estimated location (e.g., prioritizing objects based on their position with respect of the Y-axis, such that top-positioned objects are assigned relatively high priorities).

The prioritization may be performed globally or for a particular set of data. For example, the prioritization may be specific to a content file (e.g., ranking content objects embedded or referenced in the content file), to a user characteristic (e.g., browser or user device), to a type of content object (e.g., Javascripts or images), etc. A location of the object-delivery system 600 may further influence a specificity of the prioritization. For example, an object-delivery system 600 located at an edge server and/or only receiving reports associated with one edge server may identify object prioritizations specific to the edge server. Thus, in some embodiments, multiple object-delivery systems 600 may be included within a content-delivery system 100, and multiple object prioritizations may be determined. In some instances, prioritization schemes vary across different prioritizations. For example, in some embodiments, prioritizations of images depend upon their as-rendered locations, while prioritizations of Javascripts do not.

The object-delivery system 600 may include an access improver 634 to improve access to content objects assigned high priorities by the object prioritizor 630. In some instances, the access improver 634 coordinates automatic loading of the content objects assigned a high priority and/or identifies an order for automatically loading of the content objects based upon priorities. Thus, if a request for a content file is received after a prioritization performed by the object prioritizor 630, content objects assigned high priorities (e.g., and predicted to be frequently used and/or used quickly) may be quickly or immediately available to a user following rendering, e.g., of a webpage. This may be accomplished by, e.g., revising a content file (e.g., to include a content object code), automatically transmitting another file and/or high-priority content objects in response to subsequent content-file requests, and/or coordinating automatic transmission of content objects via virtual containers to prioritize the high-priority content objects.

In some instances, content files (e.g., stored in the content-file database 320) are modified. For example, an object injector 638 may inject content objects (e.g., high-priority content objects) and/or code associated with the content objects (e.g., load instructions, direct links, local links, etc.) into the modified content files. Thus, accessing the high-priority content objects may be more direct and result in faster access. In some instances, stubs associated with at least some content objects are removed. For example, code may be inserted into the content file to automatically load a high-priority content object, and an associated stub may be removed. In some instances, stubs are not removed. A stub may, e.g., include conditional instructions, such that a content object is only requested if it has not already been loaded. Therefore, even if the stub remains in the file, it will not substantially affect the functionality of the code, as it will not request objects already available locally.

As another example, a content file may be rearranged such that HTML-code content objects are ordered and/or segmented according to a priority. HTML code portions producing webpage portions viewed first may be associated with a high priority and pulled towards a top of an HTML code. HTML code portions producing infrequently viewed webpage portions may be associated with a low priority, and pushed towards a bottom of an HTML code or segmented into a separate HTML file called by the initial HTML code.

In some instances, high priority objects are collected by an object collector 640. The collected content objects may be stored or cached, e.g., in a content-object database 645. The content-object database 645 may be located, e.g., at an edge server. Thus, requests for a content file may result in requests sent to fewer, e.g., origin servers, and the speed required to respond a request for the content object may be reduced.

A delivery controller 650 may further generate and/or adapt one or more delivery protocols (e.g., stored in a delivery-protocol database 655) to improve access to high-priority content objects. For example, high-priority content objects may be automatically transmitted to an end user system 102 upon receiving a request for an associated content file. The automatically transmitted content objects may further be divided into multiple groups (to allow for multiple simultaneous transmissions) and/or ordered (e.g., within a group) to improve the quick availability of high-priority content objects. For example, FIGS. 8-9 and the related text describe embodiments related to grouping content objects into containers.

Figure 7A:
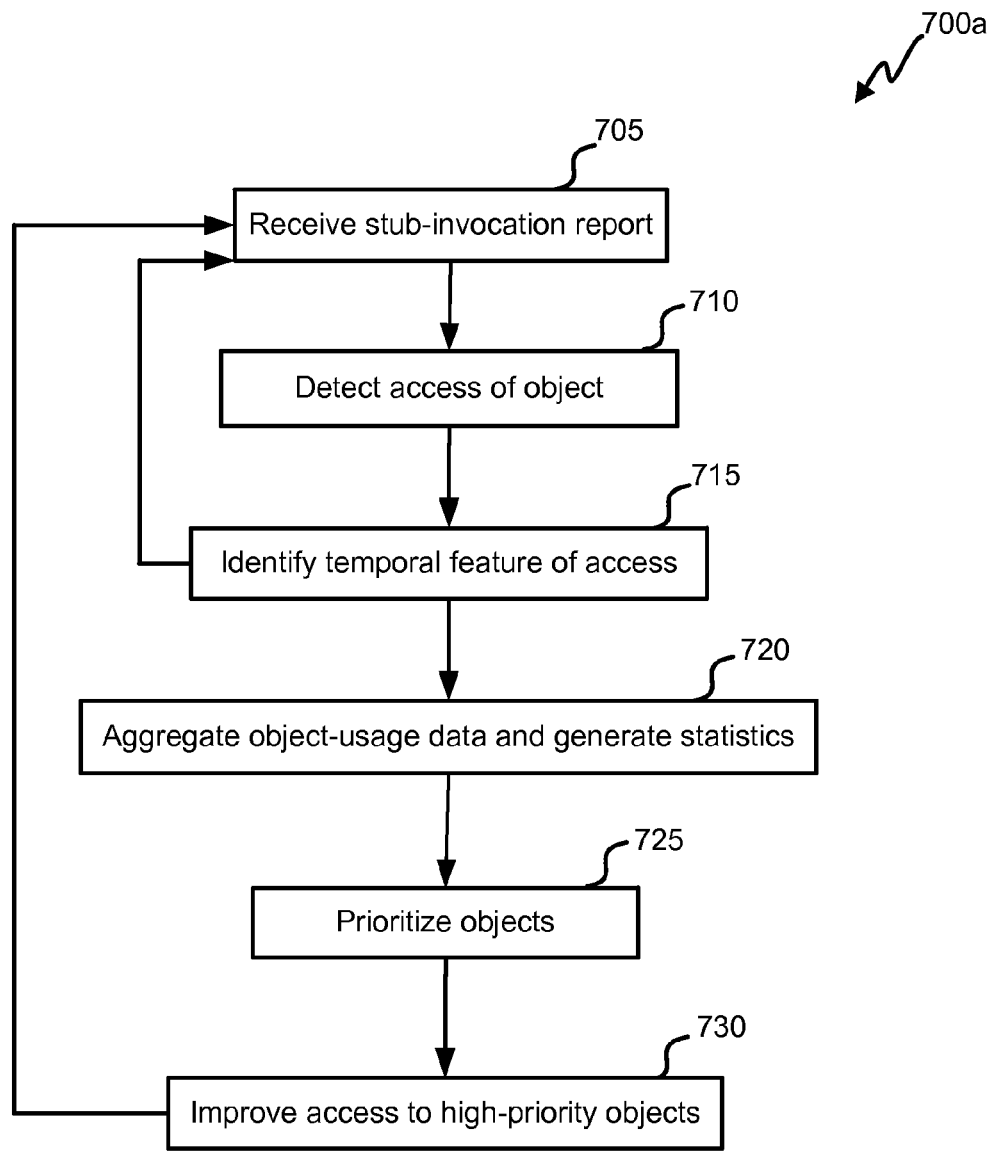
FIGS. 7a and 7b illustrate flowcharts of embodiments for prioritizing content objects.

With reference to FIG. 7a, a flow diagram of an embodiment of a process 700a for prioritizing content objects is shown. The depicted portion of the process begins in step 705 where a stub-invocation report is received by the report receiver 610. The stub-invocation report may include data identifying access to one or more content objects, associated with one or more files. The received report may include information about when the one or more content objects were accessed.

The access detector 622 detects, at block 710, access of one or more content objects based on data in the received report. The usage time-stamp identifier 624 identifies, at block 715, temporal features related to access of one or more content objects. Blocks 705-715 may be repeated to accumulate data pertaining to a content file. Subsequently or simultaneously, at block 720, the data aggregator 626 aggregates the object-usage data (e.g., including detected access and/or identified temporal features) and generates usage statistics.

Based at least in part on the generated usage statistics, the object prioritizor 630 prioritizes objects (e.g., associated with a particular content file or a group of content files, such as those served by an edge server) at block 725. At block 730, an access improver 634 improves (e.g., hastens) access to high-priority objects. The process 700a may be repeated, such that objects are dynamically and frequently prioritized. Further the process 700a may be performed in real-time or near real-time. Thus, no separate training period is necessary, and objects may be prioritized and access to objects adjusted nearly immediately after a content file is available over a network.

Figure 7B:
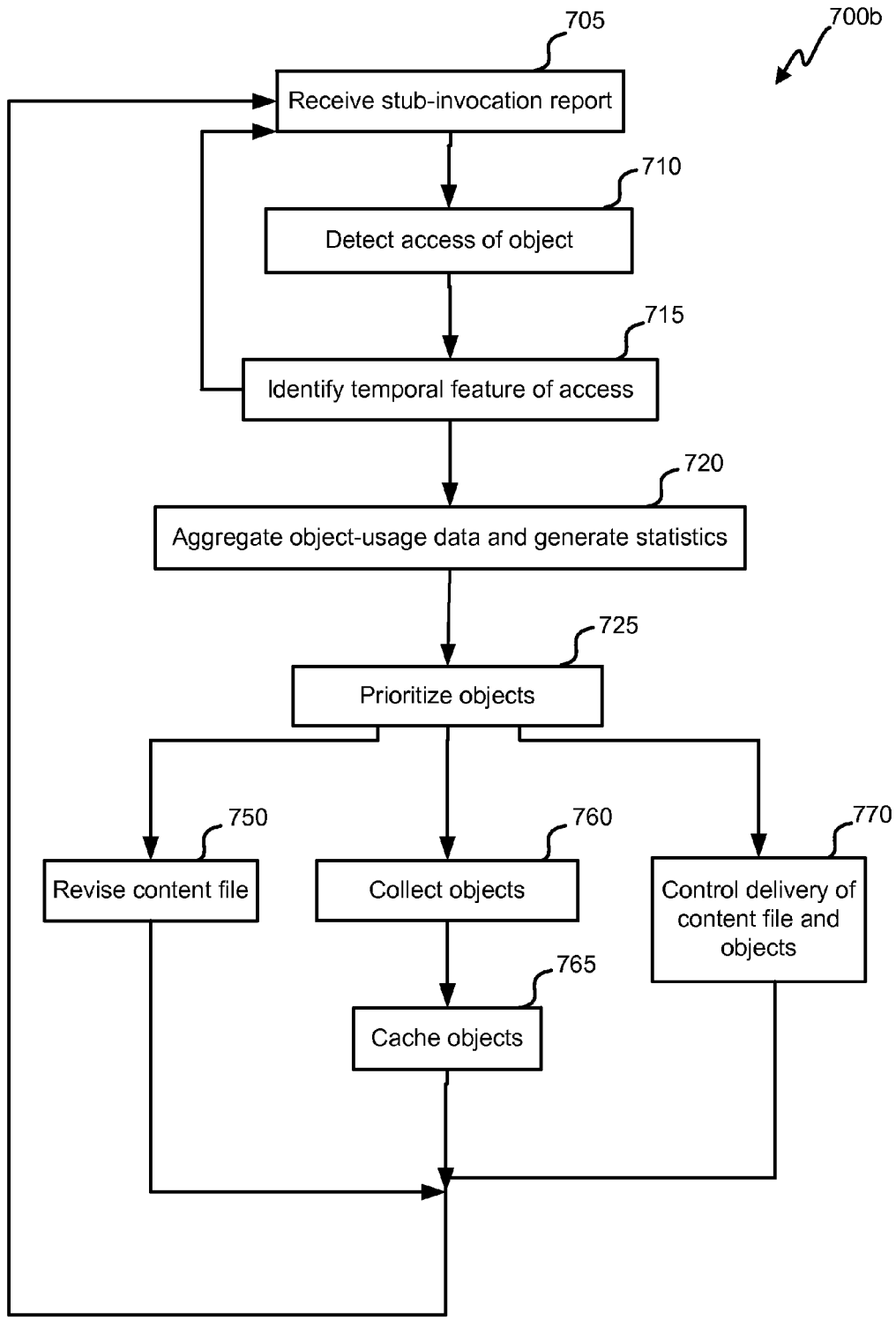

With reference to FIG. 7b, a flow diagram of an embodiment of a process 700b for prioritizing content objects is shown. Many blocks parallel those in FIG. 7a, and pertinent related disclosures are contemplated for this embodiment as well. FIG. 7b shows examples of how access to high-priority objects may be improved at block 730 in FIG. 7a.

At block 750, a content file may be revised. For example, the object injector 638 may inject a high-priority content object and/or code associated with a high-priority content object (e.g., a Javascript function, a direct and/or local link, etc.) into a content file (e.g., and may or may not further replace a stub associated with the content object). As another example, a content file may be reorganized such that high-priority portions (e.g., file-portion content objects) or high-priority calls or towards a top of the content file. As another example, a content file may be segmented such that low-priority content objects (e.g., HTML, code, a referenced object, or an embedded object) are reorganized into a separate code that is called by the revised content file.

At block 755, the object collector 640 may collect high-priority objects. The collected high-priority objects may be cached, at block 765, e.g., at a local server or edge server in a content-object database. As described in further detail below, the collected objects may be stored in or associated with virtual containers. At block 770, the delivery controller 650 may control delivery of the content file and of content objects. For example, the delivery controller 650 may determine which content objects to transmit with the content file and/or to transmit automatically upon receiving a request for the content file. The delivery controller 650 may further determine an order of transmission of content objects, a number of simultaneous downloads (of content objects) to initiate, compiling conditions, etc.

Figure 8:
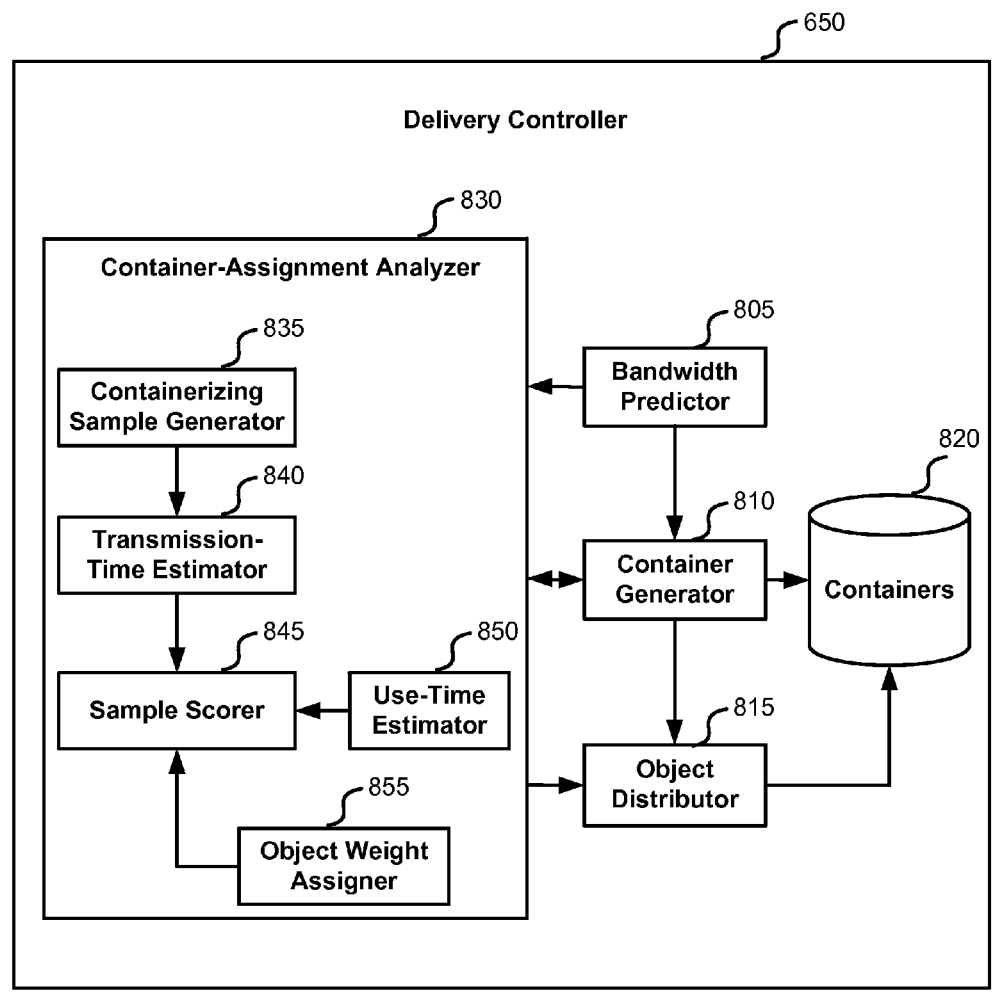
FIG. 8 depicts a block diagram of an embodiment of components of the delivery controller.

Referring next to FIG. 8, a block diagram of an embodiment of components of the delivery controller 650 is shown. In this embodiment, the delivery controller 650 includes a bandwidth predictor 805 configured to predict available bandwidth between a source location e.g., comprising the content-object database 645, and an end user system. The available bandwidth may be predicted by analyzing protocols, such as a Transmission Control Protocol, and limits associated with the protocol. The available bandwidth may be predicted based on, equations, transmissions of test objects, historical transmissions of non-test objects, etc.

A container generator 810 generates one or more virtual containers, which may be stored in a container database 820. A virtual container acts to group a plurality of content objects together. Thus, all of the group objects may be transmitted in a single transmission. The container generator 810 may identify a number of virtual containers to generate based at least partly on the prediction of an available bandwidth made by the bandwidth predictor 805. The number of containers may further depend on size of content objects and prioritizations of content objects. For example, if it is of high importance to fully transmit Content Objects #1 and #2 very quickly, but Content Object #3 is of less importance, it may be advantageous to generate two—not three—containers.

An object distributor 815 distributes content objects amongst the generated containers. Distributing the containers may include determining which content objects are assigned to specific containers and further prioritizing and/or ordering content objects within a container. The distribution may depend upon prioritization of the content objects determined by the content prioritizor 630. In some embodiments, containers are configured such that multiple containers will be simultaneously transmitted (e.g., to an end user system 102). During the transmission of the container, content objects associated with a low rank (e.g., "$1^{st}$") are transmitted prior to content objects associated with higher ranks. Thus, the object distributor 815 may distribute the content objects such that high-priority content objects are distributed amongst the containers. This will allow for multiple high-priority content objects to be simultaneously transmitted over a network and to be quickly available to a user.

In some instances, at least some containers include only content objects of a single type. For example, in one embodiment, at least one container only includes Javascript content objects and/or only includes image objects. In these instances, separate containers may or may not include different types of content objects. For example, all containers may only include Javascript content objects, or a first container may include only Javascript content objects and a second container may include only image content objects.

In some instances, at least one container (or all containers) include or are configured to include content objects of a plurality of types. Thus, a single container may include, e.g., a Flash animation object, an image object, a style sheet, and a Javascript. Embodiments disclosed herein further allow for prioritization of content objects across a plurality of types. Thus, it is possible to determine whether a particular Javascript should receive a higher priority than a particular image object. This prioritization may be based at least partly on analyzing a frequency and/or timing of actual use of these objects.

In some instances, a container property (e.g., a number of containers, a distribution of content objects amongst the containers, which or how many content objects are distributed amongst the containers, etc.) is based on an analysis performed by a container-assignment analyzer 830. The container-assignment analyzer 830 analyzes a plurality of possible container assignment configurations. Each possible container assignment configuration may include a number of containers, and an assignment of each of a plurality of content objects to one of the containers. The container-assignment analyzer may estimate transmission properties associated with each assignment configuration.

The container-assignment analyzer 830 includes a containerizing sample generator 835 that generates a plurality of sample. Each sample includes a different container assignment configuration. Thus, one or more of the number of containers, container-assignment algorithms, number of assigned content objects and identity of assigned content objects may vary across the samples. For example, a first sample may include assigning Content Objects #1, #3 and #5 to Container #1 and Content Objects #2, #4 and #6 to Container #2; a second sample may include assigning Content Objects #1, #3-6 to Container #1 and Content Object #2 and #7 to Container #2; and a third sample may include assigning Content Objects #1, #4 to Container #1, Content Object #2 to Container #2, and Content Object #3 and 5 to Container #3. In some instances, one or more of the number of containers, container-assignment algorithms, number of assigned content objects and identity of assigned content objects does not vary across the samples. For example, the container generator 810 may determine a number of containers (e.g., independently from the container-assignment analyzer 830 or based on a separate container-assignment analysis) and may transmit the number of containers to the container-assignment analyzer 830. The number of containers may then remain fixed across generated samples. As another example, the number and/or identity of content objects to be assigned to containers may remain fixed across samples.

A transmission-time estimator 840 may estimate one or more transmission times for each sample. The estimated transmission time may include, e.g., an estimated transmission time for one or more particular content objects (e.g., Content Object #1 will be transmitted in 2.5 seconds and Content Object #2 will be transmitted in 3.5 seconds, or Content Objects #1 and #2 will be transmitted in 3.5 seconds), for a group of content objects (e.g., all high priority content objects will be transmitted in 4.5 seconds), for all assigned content objects, etc. The transmission time may comprise a time relative to an initiation of container transmission, a request time, a response time, etc. The transmission times may be estimated, e.g., based on the bandwidth predicted by the bandwidth predictor 805, empirical data analysis, size of content objects, etc.

A sample scorer 845 may determine a score for each sample. The score may include, e.g., a single value, multiple values, a vector, a distribution, a range, etc. The score may be numeric. The score may include a value along a finite or infinite continuum. The score may include a rank (e.g., ranking across samples).

The score may be based at least partly on the estimated transmission time(s). For example, higher scores may be associated with shorter estimated transmission times. The score may depend on a total estimated transmission time (e.g., an estimated time for transmitting all containers or all content objects in containers), an estimated transmission time associated with a group of objects (e.g., an estimated time for transmitting all high-priority content objects), and/or an estimated transmission time associated with one, more or all particular objects. In one instance, a value for a transmission-time variable is determined for each content object of a plurality of content objects (e.g., all content objects to be transmitted), and the score is a weighted or unweighted sum of the values.

In some instances, one or more use times are estimated by a use-time estimator 850. A use time may identify a time at which it is estimated that a user will wish to use a content object (e.g., interact with a Javascript script, view an image, initiate a Flash animation, etc.). The use time may be estimated, e.g., based on an analysis performed by the object usage analyzer 620, object usage statistics 628, data from the as-rendered locator 632, prioritizations determined by the object prioritizor 630, etc. For example, objects associated with a priority of sufficiently low rank may be associated with an estimated use time of "0", indicating that a user will likely wish to use the content object immediately upon loading a page. As another example, objects located at a top of a page may be associated with use times shorter than objects located at a bottom of a page. As another example, object use times may include a median actual use time. As another example, the object usage statistics may include a distribution of access times, and the use time may include a time at which X % (e.g., 5%) of the population had accessed the object by that point, or the use time may include a fastest access time amongst a population. The use-time estimation may include, e.g., a single time or distribution of times.

The score determined by the sample scorer 845 may at least partly depend on the one or more use times estimated by the use-time estimator. In some instances, the score is at least partly based on comparing the estimated transmission time to the estimated use time. The comparison may result in a binary or non-binary value. For example, for each content object it may be determined whether the estimated transmission time is shorter than the estimated use time, or—in instances in which the estimated transmission time and/or estimated use time comprise probability distributions—the probability that the estimated transmission time is shorter than the estimated use time.

The container-assignment analyzer 830 may include an object weight assigner 855. The object weight assigner 855 may assign a weight to one or more variables contributing to a score determined by the sample scorer. In some instances, the score comprises a summation of variable values, each value being associated with a different content object or set of content objects. The object weight assigner 855 may assign a weight to be associated with each content object or set of content objects. The weight may be based, e.g., on a priority determined by the object priotizor 630. Thus, a score may be more heavily influenced by estimated transmission times associated with high-priority content objects as compared to estimated transmission times associated with low-priority content objects.

Based on the scores determined by the sample scorer, the container generator 810 may determine a number of containers to generator and/or the object distributor 815 may determine a distribution scheme, a number of content objects to distribute amongst containers and/or an identity of content objects to distribute amongst containers. The determination may be based at least partly on samples associated with high scores. For example, if a highest score sample has a particular content-object distribution technique, the object distributor 815 may use a similar distribution technique.

In some instances, the delivery controller 650 does not include a container-assignment analyzer 830 that generates and analyzes samples. For example, the delivery controller 650 may determine a number of containers to be generated and/or object distribution schemes based on solving one or more transmission equations to transmit select or all of the content objects quickly, most quickly or prior to estimated use.

Figure 9:
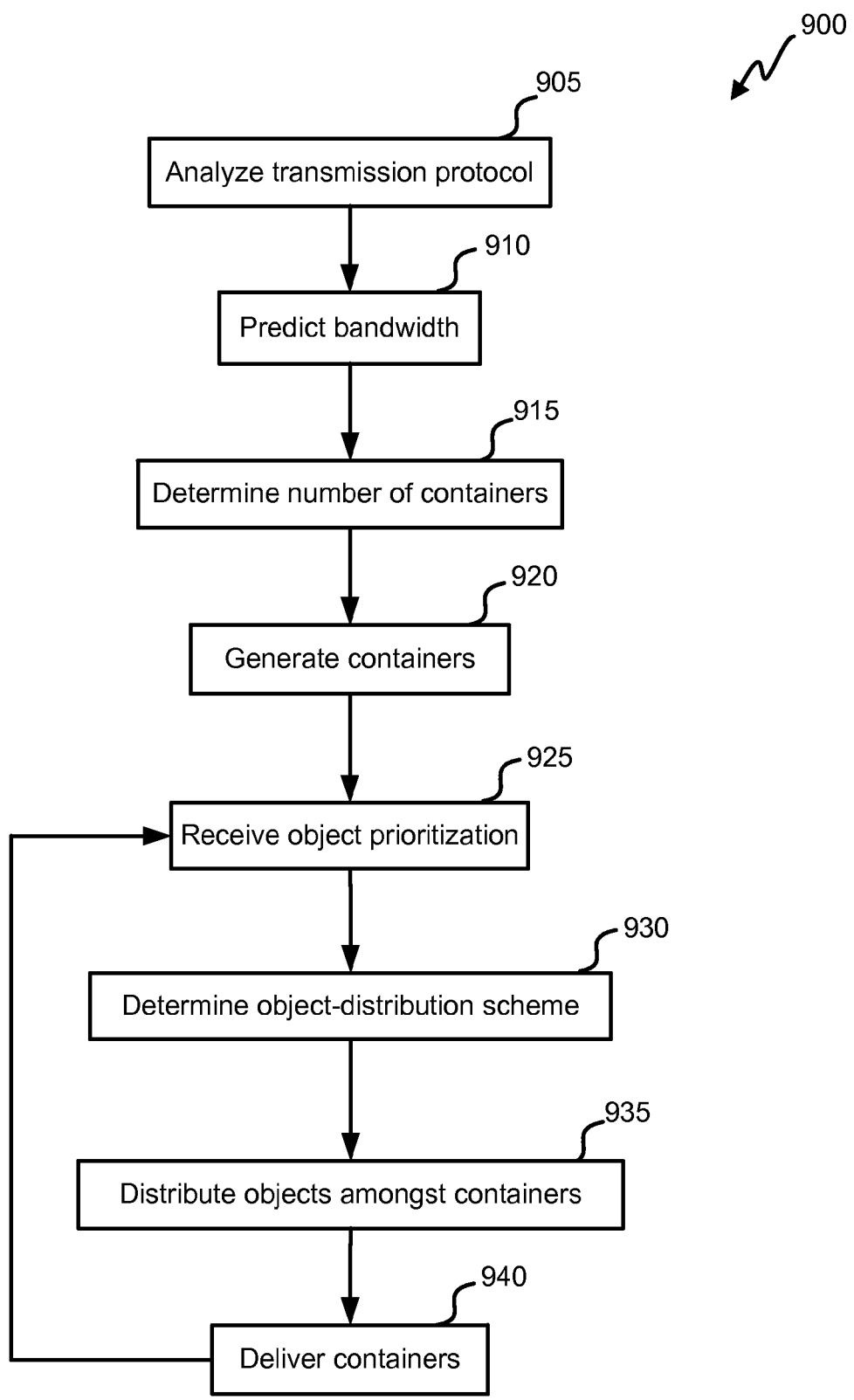
FIG. 9 illustrates a flowchart of an embodiment of a process for delivering content objects.

With reference to FIG. 9, a flow diagram of an embodiment of a process 900 for delivering content objects is shown. The depicted portion of the process begins in step 905 where a transmission protocol is analyzed. For example, a protocol, such as TCP, may limit throughput of a connection based on various factors. These factors may be identified and analyzed. At block 910, the bandwidth predictor 805 predicts the a bandwidth. At block 915, a container generator determines a number of containers to associate with a content file or a number of containers generally. The number of containers may be based at least partly on the predicted bandwidth and analysis of the transmission protocol. At block 920, the container generator generates the containers. At block 925, the object distributor 830 receives object prioritization e.g., from the object prioritizor 630. At block 930, an object-distribution scheme is determined by the object distributor 915. The object-distribution scheme may or may not vary across different distributions. A distribution scheme may consider, e.g., object priorities, a number of generated containers, object sizes, and/or estimated object use times to determine how objects are to be distributed amongst the containers. At block 935, content objects (e.g., associated with a content file) are distributed amongst the containers in accordance with the determined object-distribution scheme. At block 940, the containers are then be delivered, e.g., to an end user system 120.

Thus, each content file of a plurality of content files may be associated with one or more (e.g., a plurality of) containers, and at least some of the content objects associated with the content file may be distributed amongst the containers. In some instances, at least some content objects are not distributed amongst the containers. For example, some (e.g., high priority) content objects may be integrated into the content file itself, and/or some (e.g., rarely used) content objects may be available only upon request.

Figure 10:
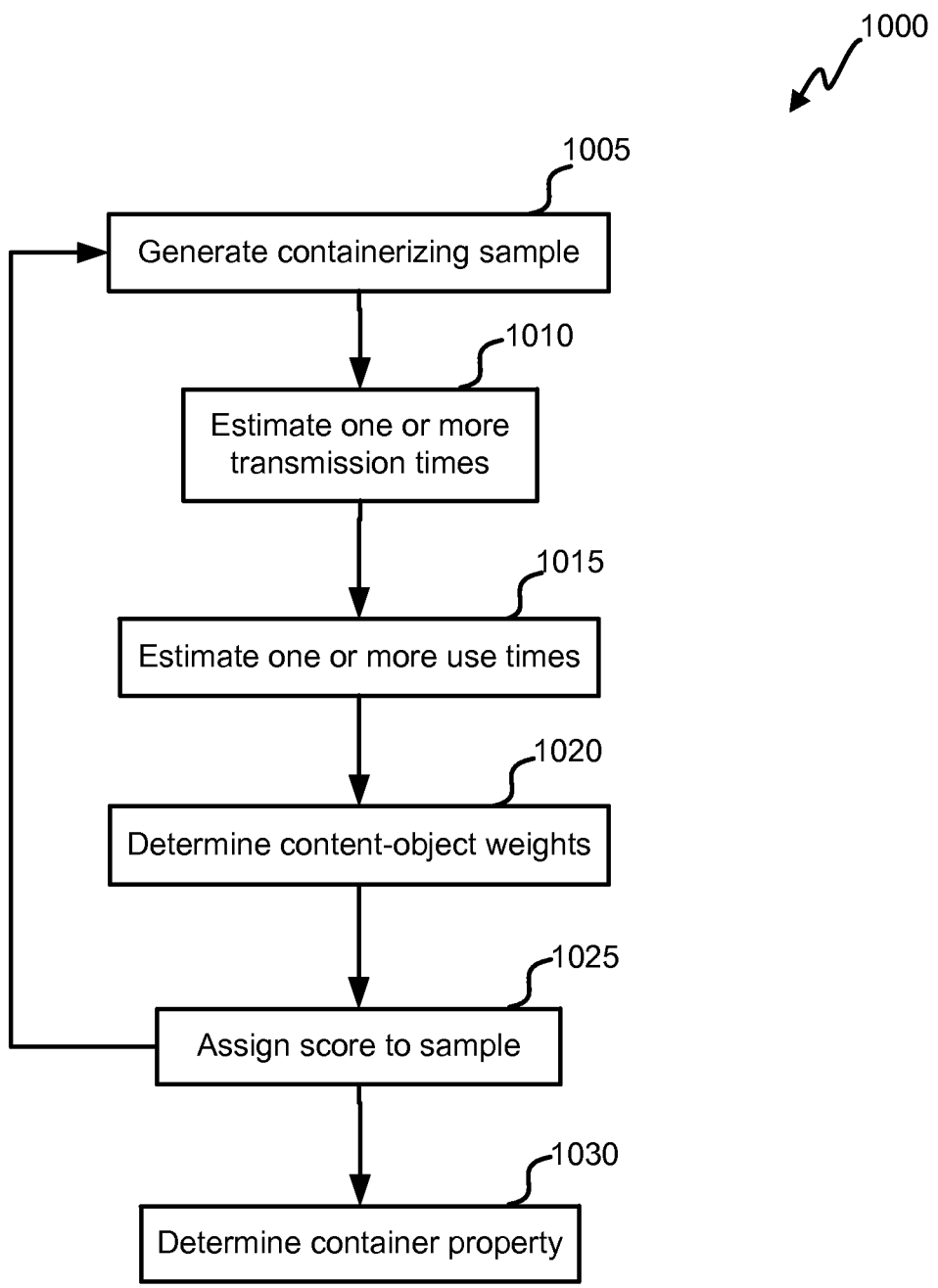
FIG. 10 illustrates a flowchart of an embodiment of a process for determining a container property.

With reference to FIG. 10, a flow diagram of an embodiment of a process 1000 for determining a container property (e.g., a number of containers to generate, an object-distribution scheme, etc.) is shown. The depicted portion of the process begins in step 1005 where a containerizing sample is generated by the containerizing sample generator 835. The sample may include a container assignment for each of a plurality of content objects. At block 1010, one or more transmission times are estimated by the transmission-time estimator 840. For example, an estimate of a time required for each content object of the plurality of content objects to be fully transmitted, relative to an initiation of container transmission, may be made. At block 1015, one or more use times are estimated by use-time estimator 850. The use-time estimates may depend, e.g., on an empirical-data analysis, as-rendered page location of the objects, etc. At block 1020, a weight is determined for one or more content objects or groups of content objects by the object weight assigner 855. For example, a weight may be determined for each content object to be transmitted. The weight may depend, e.g., on a priority associated with the content object. At block 1025, a score is assigned to the sample by the sample scorer 845. The assigned score may be based on one or more of the estimated transmission time(s), estimated use time(s), and content-object weight(s). For example, in one instance, the assigned score depends on the number of content objects estimated to be fully transmitted prior to a user's attempted use of the object.

Blocks 1005-1025 may be repeated, such that a plurality of samples are generated and scored. Each sample may be associated, e.g., with different distributions of content objects and/or number of containers. At block 1030, a container property (e.g., number of containers, distribution schemes, content objects to distribute, etc.) is determined. The determined container property may or may not be specific, e.g., to particular content objects, to a specific content file embedding or referencing the content objects, specific transmission lines, specific requests, etc.

Figure 11:
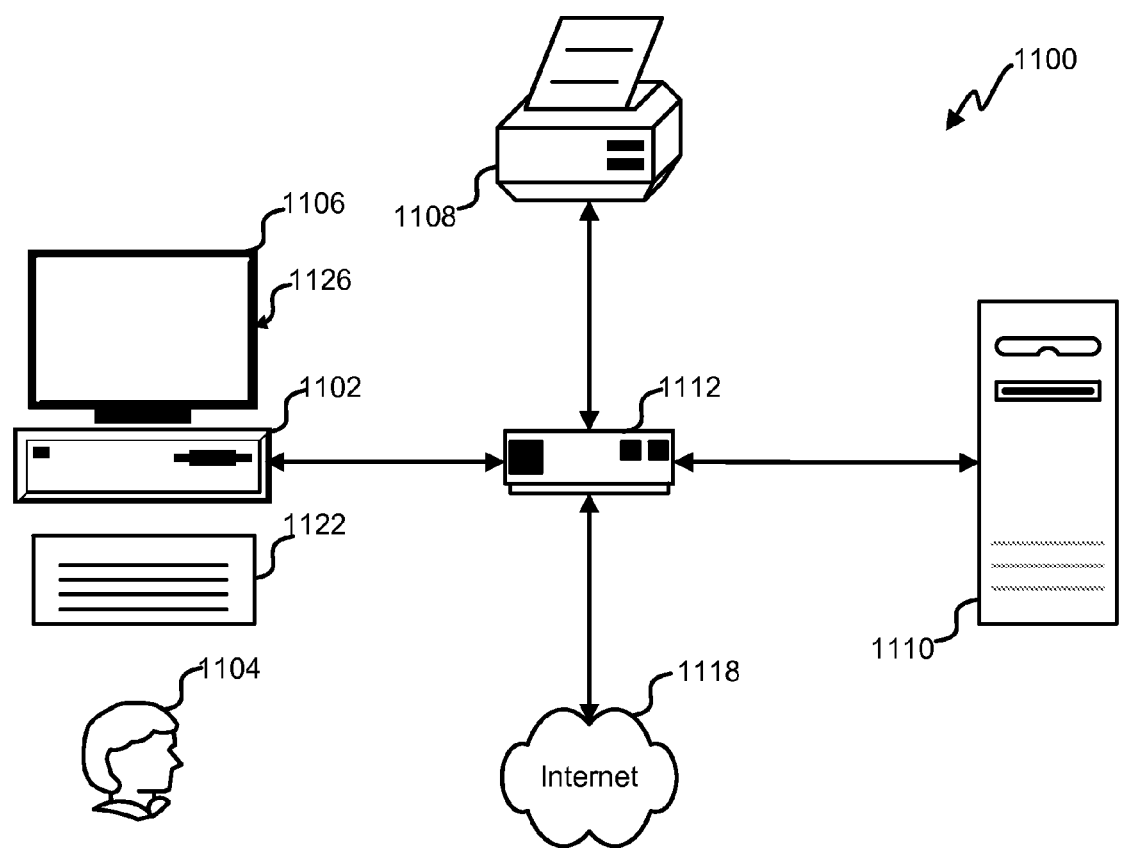
FIG. 11 depicts a block diagram of an embodiment of a computer system.

Referring next to FIG. 11, an exemplary environment with which embodiments may be implemented is shown with a computer system 1100 that can be used by a designer 1104 to design, for example, electronic designs. The computer system 1100 can include a computer 1102, keyboard 1122, a network router 1112, a printer 1108, and a monitor 1106. The monitor 1106, processor 1102 and keyboard 1122 are part of a computer system 1126, which can be a laptop computer, desktop computer, handheld computer, mainframe computer, etc. The monitor 1106 can be a CRT, flat screen, etc.

A designer 1104 can input commands into the computer 1102 using various input devices, such as a mouse, keyboard 1122, track ball, touch screen, etc. If the computer system 1100 comprises a mainframe, a designer 1104 can access the computer 1102 using, for example, a terminal or terminal interface. Additionally, the computer system 1126 may be connected to a printer 1108 and a server 1110 using a network router 1112, which may connect to the Internet 1118 or a WAN.

The server 1110 may, for example, be used to store additional software programs and data. In one embodiment, software implementing the systems and methods described herein can be stored on a storage medium in the server 1110. Thus, the software can be run from the storage medium in the server 1110. In another embodiment, software implementing the systems and methods described herein can be stored on a storage medium in the computer 1102. Thus, the software can be run from the storage medium in the computer system 1126. Therefore, in this embodiment, the software can be used whether or not computer 1102 is connected to network router 1112. Printer 1108 may be connected directly to computer 1102, in which case, the computer system 1126 can print whether or not it is connected to network router 1112.

Figure 12:
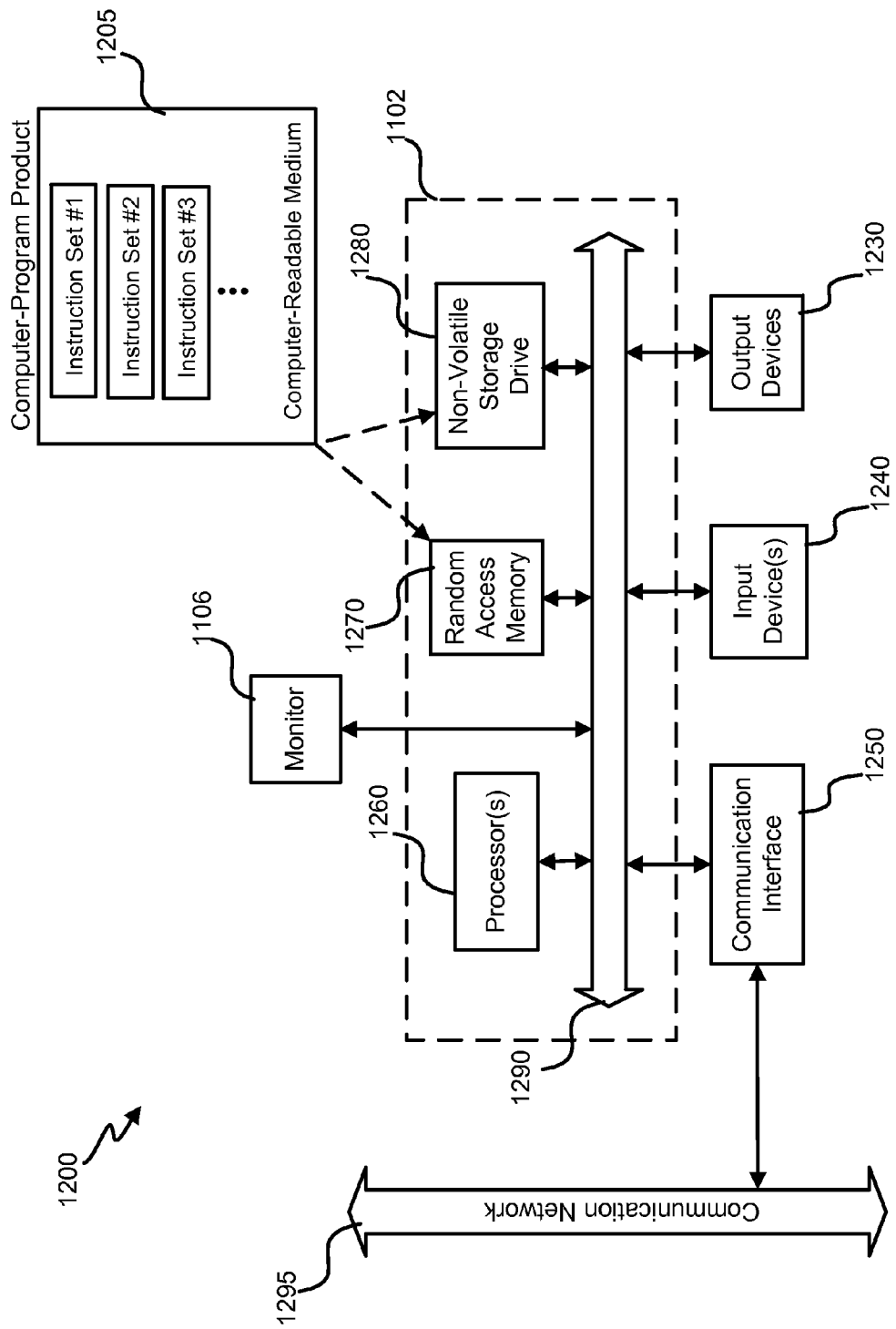
FIG. 12 depicts a block diagram of an embodiment of a special-purpose computer.

With reference to FIG. 12, an embodiment of a special-purpose computer system 1200 is shown. For example, one or more of content-modifying system 300, object-delivery system 600, delivery controller 650 may be a special-purpose computer system 1200. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1126, it is transformed into the special-purpose computer system 1200.

Special-purpose computer system 1200 comprises a computer 1102, a monitor 1106 coupled to computer 1102, one or more additional user output devices 1230 (optional) coupled to computer 1102, one or more user input devices 1240 (e.g., keyboard, mouse, track ball, touch screen) coupled to computer 1102, an optional communications interface 1250 coupled to computer 1102, a computer-program product 1205 stored in a tangible computer-readable memory in computer 1102. Computer-program product 1205 directs system 1200 to perform the above-described methods. Computer 1102 may include one or more processors 1260 that communicate with a number of peripheral devices via a bus subsystem 1290. These peripheral devices may include user output device(s) 1230, user input device(s) 1240, communications interface 1250, and a storage subsystem, such as random access memory (RAM) 1270 and non-volatile storage drive 1280 (e.g., disk drive, optical drive, solid state drive), which are forms of tangible computer-readable memory.

Computer-program product 1205 may be stored in non-volatile storage drive 1280 or another computer-readable medium accessible to computer 1102 and loaded into memory 1270. Each processor 1260 may comprise a microprocessor, such as a microprocessor from Intel® or Advanced Micro Devices, Inc.®, or the like. To support computer-program product 1205, the computer 1102 runs an operating system that handles the communications of product 1205 with the above-noted components, as well as the communications between the above-noted components in support of the computer-program product 1205. Exemplary operating systems include Windows® or the like from Microsoft Corporation, Solaris® from Sun Microsystems, LINUX, UNIX, and the like.

User input devices 1240 include all possible types of devices and mechanisms to input information to computer system 1102. These may include a keyboard, a keypad, a mouse, a scanner, a digital drawing pad, a touch screen incorporated into the display, audio input devices such as voice recognition systems, microphones, and other types of input devices. In various embodiments, user input devices 1240 are typically embodied as a computer mouse, a trackball, a track pad, a joystick, wireless remote, a drawing tablet, a voice command system. User input devices 1240 typically allow a user to select objects, icons, text and the like that appear on the monitor 1106 via a command such as a click of a button or the like. User output devices 1230 include all possible types of devices and mechanisms to output information from computer 1102. These may include a display (e.g., monitor 1106), printers, non-visual displays such as audio output devices, etc.

Communications interface 1250 provides an interface to other communication networks and devices and may serve as an interface to receive data from and transmit data to other systems, WANs and/or the Internet 1118. Embodiments of communications interface 1250 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1250 may be coupled to a computer network, to a FireWire® bus, or the like. In other embodiments, communications interface 1250 may be physically integrated on the motherboard of computer 1102, and/or may be a software program, or the like.

RAM 1270 and non-volatile storage drive 1280 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1270 and non-volatile storage drive 1280 may be configured to store the basic programming and data constructs that provide the functionality of various embodiments of the present invention, as described above.

Software instruction sets that provide the functionality of the present invention may be stored in RAM 1270 and non-volatile storage drive 1280. These instruction sets or code may be executed by the processor(s) 1260. RAM 1270 and non-volatile storage drive 1280 may also provide a repository to store data and data structures used in accordance with the present invention. RAM 1270 and non-volatile storage drive 1280 may include a number of memories including a main random access memory (RAM) to store of instructions and data during program execution and a read-only memory (ROM) in which fixed instructions are stored. RAM 1270 and non-volatile storage drive 1280 may include a file storage subsystem providing persistent (non-volatile) storage of program and/or data files. RAM 1270 and non-volatile storage drive 1280 may also include removable storage systems, such as removable flash memory.

Bus subsystem 1290 provides a mechanism to allow the various components and subsystems of computer 1102 communicate with each other as intended. Although bus subsystem 1290 is shown schematically as a single bus, alternative embodiments of the bus subsystem may utilize multiple busses or communication paths within the computer 1102.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-readable storage device containing program instructions, that, when executed by one or more servers, cause the one or more servers to execute a method for dynamically serving a content file with embedded or referenced content objects over the Internet to an end user system, the method-comprising:
    accessing a request, from the end user system, for a webpage defined by the content file, the content file comprising a plurality of embedded or referenced content objects;
    modifying the content file by injecting a reporting code into the content file, the reporting code comprising instructions to generate one or more reports comprising information relating to the plurality of content objects;
    accessing one or more reports generated in response to implementation of the reporting code in the modified content file, wherein the reports indicate for at least two of the plurality of content objects where the content object was rendered within the webpage;
    prioritizing, in real time, the plurality of content objects, wherein the prioritization depends on where the at least two of the plurality of content objects were rendered within the webpage; and
    adapting, in real-time, one or more protocols for delivering at least some of the plurality of content objects to improve access to content objects assigned a high priority in the prioritization.

2. The computer-readable storage device as recited in claim 1, wherein the reports indicate for the at least two of the plurality of content objects a Y-axis location of the content object within the webpage, and
    wherein the prioritization depends on the identified locations.

3. The computer-readable storage device as recited in claim 1, wherein the method further comprises:
    generating one or more virtual containers; and
    for each container of the one or more virtual containers:
        assigning two or more content objects of the plurality of content objects to the container; and
        ordering the two or more content objects of the plurality of content objects with respect to each other,
    wherein the assigning and ordering are based at least partly on the prioritization of the plurality of content objects, and
    wherein, responsive to a subsequent request for the webpage from another end user system, the one or more virtual containers comprising the assigned content objects are automatically transmitted to the another end user system.

4. The computer-readable storage device as recited in claim 3, wherein at least one of the virtual containers is configured to simultaneously contain content objects of a plurality of types.

5. The computer-readable storage device as recited in claim 1, wherein the at least two of the of embedded content objects are content objects of different types.

6. The computer-readable storage device as recited in claim 1, wherein each of the at least two of the plurality of content objects is an image content object.

7. The computer-readable storage device as recited in claim 1, wherein the method further comprises generating a transmission protocol such that the content objects assigned the high priority are automatically transmitted to a second end user system following a request from the second user system for the webpage and prior to a request from the second end user system for the content objects assigned the high priority.

8. A system for dynamically serving content files with embedded or referenced content objects over the Internet to an end user system, the system comprising:
- one or more servers; and
- one or more memories coupled with said one or more servers, wherein the one or more servers and the one or more memories are configured to:
  - access a request, from the end user system, for one or more content files associated with a webpage, the one or more content files embedding or referencing a plurality of content objects;
  - access data from the end user system that indicates a location of at least some of the plurality of content objects within the webpage;
  - prioritize the plurality of content objects, wherein the prioritization is based at least in part on the locations of the at least some of the plurality of content objects; and
  - adapt one or more protocols to improve access to content objects assigned a high priority, such that responsive to a second request for the one or more content files associated with the webpage from a second end user system, the high-priority content objects are provided to the second end user system faster than they were to the end user system.

9. The system for dynamically serving content files with embedded or referenced content objects over the Internet to the end user system as recited in claim 8, wherein the location includes a location with respect to a Y-axis within the webpage.

10. The system for dynamically serving content files with embedded or referenced content objects over the Internet to the end user system as recited in claim 8, wherein the one or more servers and the one or more memories are further configured to, for each container of one or more virtual containers:
- assign two or more content objects of the plurality of content objects to the container; and
- order the two or more content objects of the plurality of content objects with respect to each other,
- wherein the assigning and ordering are based at least partly on the prioritization of the at least some of the plurality of content objects, and
- wherein, responsive to the second request for the one or more content files from the second end user system, the one or more virtual containers comprising the assigned content objects are transmitted to the second end user system, such that the second end user system receives content objects in the one or more containers that are associated with low orders prior to receiving content objects in the one or more containers that are associated with high orders.

11. The system for dynamically serving content files with embedded or referenced content objects over the Internet to the end user system as recited in claim 8, wherein the prioritization of the plurality of content objects is repeatedly revised based on data from other end user systems that indicates a location of at least some of the plurality of content objects within the webpage.

12. The system for dynamically serving content files with embedded or referenced content objects over the Internet to the end user system as recited in claim 8, wherein the one or more servers and the one or more memories are further configured to modify a content file of the one or more content files by injecting, a reporting code into the content file, the reporting code comprising instructions to transmit the data to the as-rendered locator.

13. The system for dynamically serving content files with embedded or referenced content objects over the Internet to the end user system as recited in claim 8, wherein the or more servers and the one or more memories are further configured to cache the high-priority content objects.

14. The system for dynamically serving content files with embedded or referenced content objects over the Internet to the end user system as recited in claim 8, wherein the request comprises a uniform resource locator, and the one or more content files define the webpage.

15. A method for dynamically serving content files with embedded or referenced content objects over the Internet to an end user system, the method comprising:
- receiving a request, from the end user system, for one or more content files, the one or more content files embedding or referencing a plurality of content objects;
- determining, based on data received from the end user system, that a first content object of the plurality of content objects is made accessible to a user of the end user system before a second content object of the plurality of content objects is made accessible to the user of the end user system, the determination being based on a first location of the first content object within a webpage and a second location of the first content object within the webpage;
- prioritizing the plurality of content objects, such that the prioritization prioritizes the first content object over the second content object;
- adapting one or more protocols for delivering at least some of the plurality of content objects to improve access to the first content object, such that upon receiving a second request for the one or more content files associated with the webpage from a second end user system, the high-priority content objects are provided to the second end user system faster than they were to the end user system.

16. The method for dynamically serving content files with embedded or referenced content objects over the Internet to the end user system as recited in claim 15, wherein adapting the one or more protocols comprises: upon receiving the second request, providing the first content object to the second end user system automatically.

17. The method for dynamically serving content files with embedded or referenced content objects over the Internet to the end user system as recited in claim 15, wherein adapting the one or more protocols comprises: caching the first content object at an edge server serving the request.

18. The method for dynamically serving content files with embedded or referenced content objects over the Internet to the end user system as recited in claim 15, wherein the plurality of content objects comprise a content object embedded in the one or more content files and a content object referenced in the one or more content files.

19. The method for dynamically serving content files with embedded or referenced content objects over the Internet to the end user system as recited in claim 15, wherein the method is provided at an edge server within a content delivery network.

20. The method for dynamically serving content files with embedded or referenced content objects over the Internet to the end user system as recited in claim 15, wherein the first content object comprises an image and the second content object comprises a Javascript.

* * * * *